United States Patent
Carlson

(10) Patent No.: US 10,097,353 B1
(45) Date of Patent: Oct. 9, 2018

(54) DIGITAL UNLOCKING OF SECURE CONTAINERS

(71) Applicant: Amazon Technologies, Inc., Seattle, WA (US)

(72) Inventor: Ty Loren Carlson, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/862,149

(22) Filed: Sep. 22, 2015

(51) Int. Cl.
| | |
|---|---|
| *H04L 29/00* | (2006.01) |
| *H04L 9/32* | (2006.01) |
| *H04W 12/06* | (2009.01) |
| *H04W 4/021* | (2018.01) |
| *H04L 29/08* | (2006.01) |
| *H04L 9/30* | (2006.01) |

(Continued)

(52) U.S. Cl.
CPC ........ *H04L 9/3236* (2013.01); *G07C 9/00039* (2013.01); *G07C 9/00111* (2013.01); *G08B 13/2454* (2013.01); *G08B 13/2462* (2013.01); *H04L 9/30* (2013.01); *H04L 67/306* (2013.01); *H04W 4/021* (2013.01); *H04W 12/06* (2013.01)

(58) Field of Classification Search
CPC ......... H04L 9/3236; H04L 9/30; H04L 47/70; H04L 12/4641; H04L 67/34; H04L 41/0896; G07C 9/00111; H04W 4/12; H04W 4/18; H04W 92/02; G06F 8/63; G06F 9/45558; G06F 2009/45562
See application file for complete search history.

(56) References Cited

U.S. PATENT DOCUMENTS

| | | | |
|---|---|---|---|
| 6,260,144 B1 * | 7/2001 | Pitchenik | G06Q 20/3672 380/51 |
| 7,561,049 B2 * | 7/2009 | Rodgers | G06K 19/07309 340/10.1 |
| 9,111,283 B1 * | 8/2015 | Diorio | |

(Continued)

OTHER PUBLICATIONS

Sarma, Sanjay E., Stephen A. Weis, and Daniel W. Engels. "RFID systems and security and privacy implications." International Workshop on Cryptographic Hardware and Embedded Systems. Springer Berlin Heidelberg, 2002.*

(Continued)

*Primary Examiner* — Don Zhao
(74) *Attorney, Agent, or Firm* — Eversheds Sutherland (US) LLP

(57) ABSTRACT

A user device outputs an unlock code or sends a signal that automatically unlocks a locked container housing a deliverable product when the user device authenticates the container, thereby indicating that the container has been delivered to an intended recipient. The device is associated with a user profile and stores a private key that is inaccessible except by the device. When a product order becomes associated with the user profile, a public key that pairs with the private key is encoded on a storage medium of the container. When the container is brought into proximity with the device, if the device determines that the public key encoded on the storage medium corresponds to the private key stored on the device, the device displays or audibly outputs an unlock code or sends a wireless signal that automatically unlocks the container. The container can also include sensors for detecting theft or tampering.

20 Claims, 8 Drawing Sheets

(51) Int. Cl.
*G07C 9/00* (2006.01)
*G08B 13/24* (2006.01)

(56) References Cited

U.S. PATENT DOCUMENTS

| | | | | |
|---|---|---|---|---|
| 9,489,785 | B2* | 11/2016 | Klammer | G07C 9/00111 |
| 2002/0129283 | A1* | 9/2002 | Bates | G06F 21/31 |
| | | | | 726/5 |
| 2004/0158714 | A1* | 8/2004 | Peyravian | H04L 9/0825 |
| | | | | 713/171 |
| 2007/0054616 | A1* | 3/2007 | Culbert | H04L 63/0492 |
| | | | | 455/41.1 |
| 2011/0289122 | A1* | 11/2011 | Grube | G06F 11/2094 |
| | | | | 707/812 |
| 2013/0203345 | A1* | 8/2013 | Fisher | H04B 1/3816 |
| | | | | 455/41.1 |
| 2014/0136649 | A1* | 5/2014 | Narayanaswami | H04L 67/02 |
| | | | | 709/217 |
| 2014/0293314 | A1* | 10/2014 | Amarendra | G06F 21/35 |
| | | | | 358/1.14 |
| 2015/0169832 | A1* | 6/2015 | Davis | A61B 5/165 |
| | | | | 702/19 |
| 2015/0356801 | A1* | 12/2015 | Nitu | G07C 9/00166 |
| | | | | 340/5.61 |
| 2016/0188887 | A1* | 6/2016 | Ghafourifar | G06F 21/602 |
| | | | | 713/189 |

OTHER PUBLICATIONS

Peris-Lopez, Pedro, et al. "RFID systems: A survey on security threats and proposed solutions." IFIP International Conference on Personal Wireless Communications. Springer Berlin Heidelberg, 2006.*

Feldhofer, Martin. "An authentication protocol in a security layer for RFID smart tags." Electrotechnical Conference, 2004. MELECON 2004. Proceedings of the 12th IEEE Mediterranean. vol. 2. IEEE, 2004.*

* cited by examiner

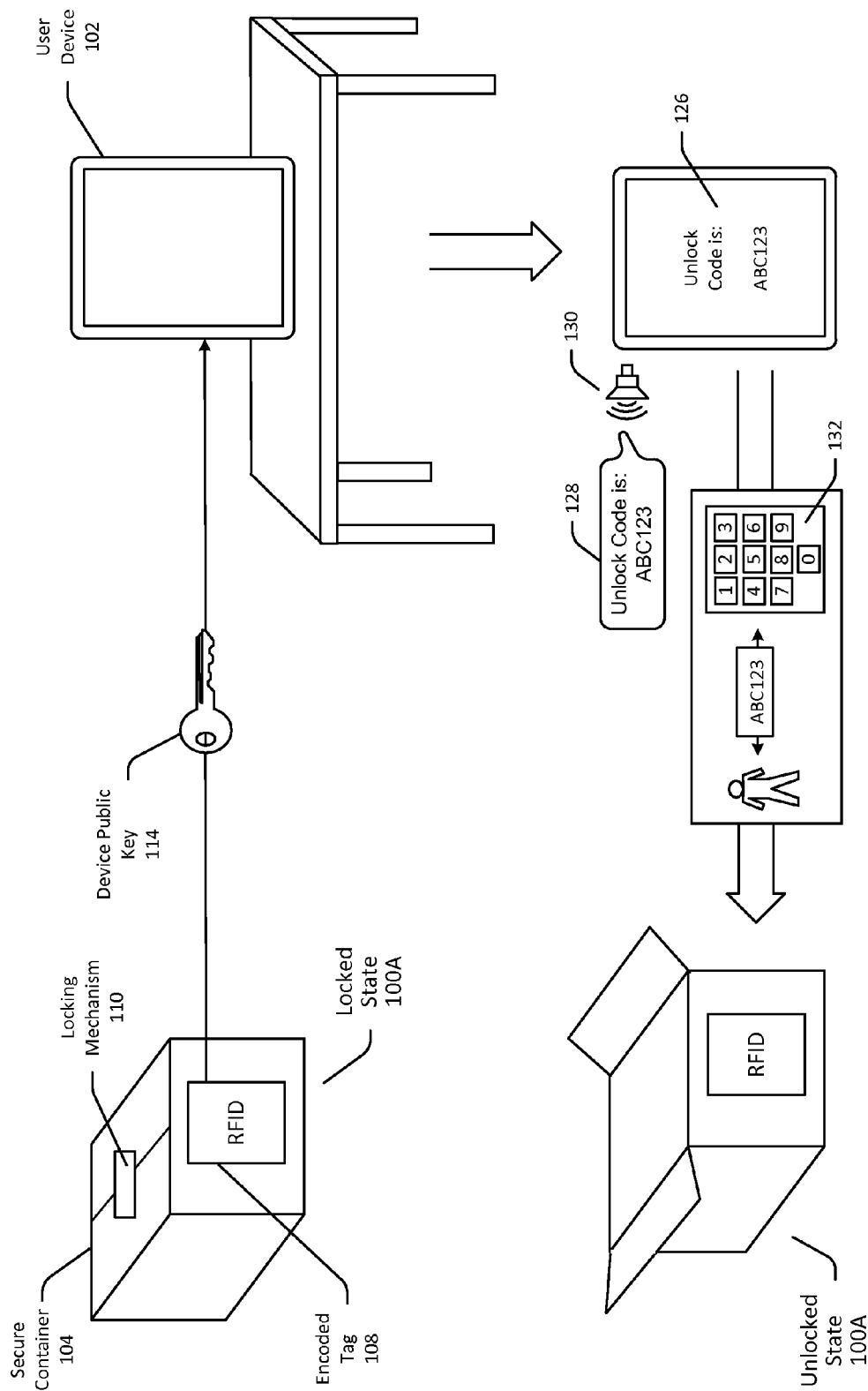

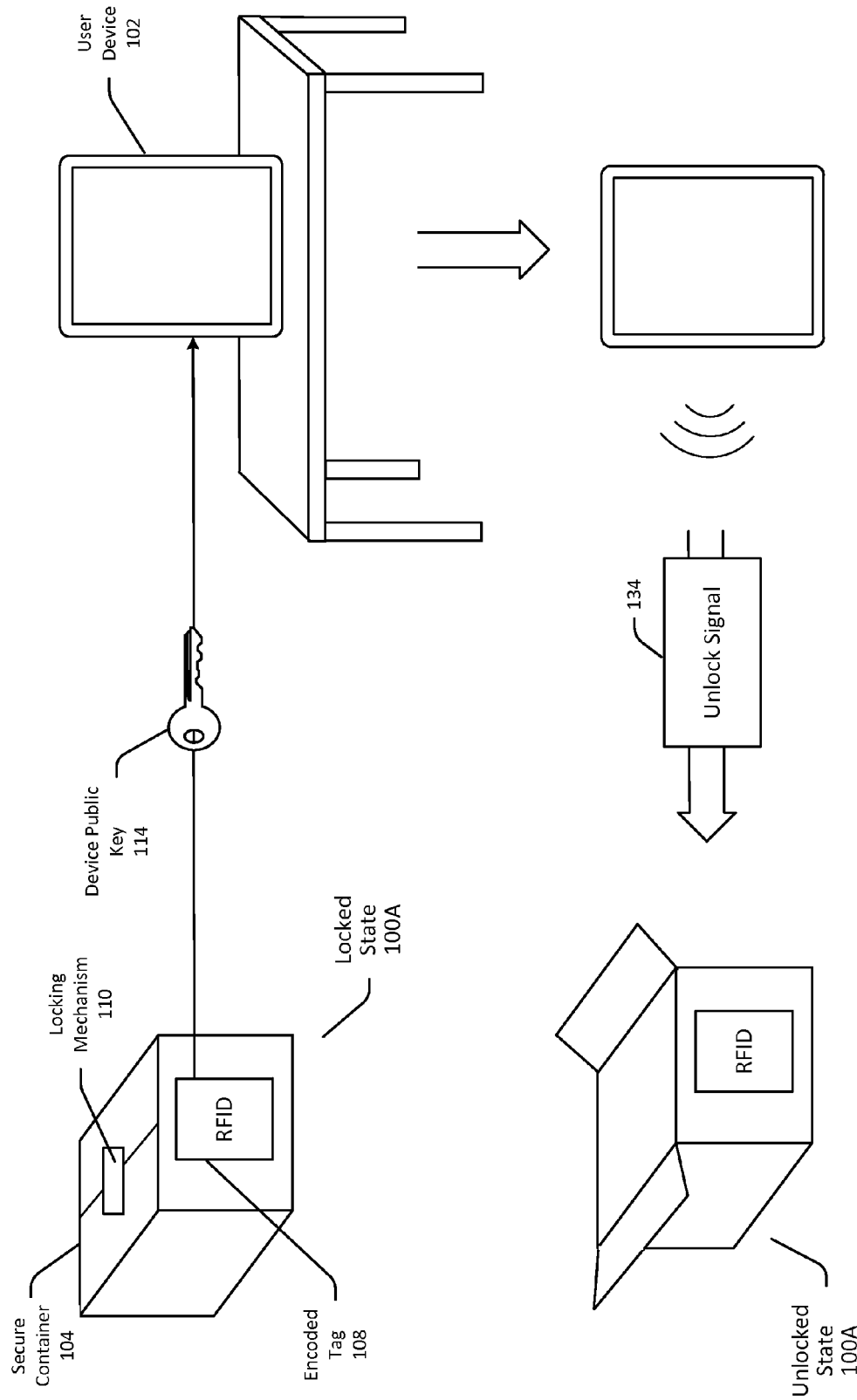

DIGITAL UNLOCKING OF SECURE CONTAINERS

BACKGROUND

Increased data transmission rates and greater availability of network connectivity as well as improved capabilities of network-accessible devices have led more consumers to order products online in lieu of purchasing them at traditional brick-and-mortar establishments. For example, a variety of products such as a prescription drugs, groceries, and so forth are now increasingly being acquired through online channels. Discussed herein are technological solutions to mitigate tampering and theft of products when delivered, which may be especially helpful for products that are strictly regulated or have a higher chance of being misused.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 1B is a schematic diagram illustrating authentication of a secure container with respect to a user device and outputting of an unlock code by the user device for deactivating a locking mechanism of the secure container in accordance with one or more example embodiments of the disclosure.

FIG. 1C is a schematic diagram illustrating authentication of a secure container with respect to a user device and transmission of an wireless unlock signal from the user device to the container to deactivate a locking mechanism of the secure container in accordance with one or more example embodiments of the disclosure.

DETAILED DESCRIPTION

Figure 1A:
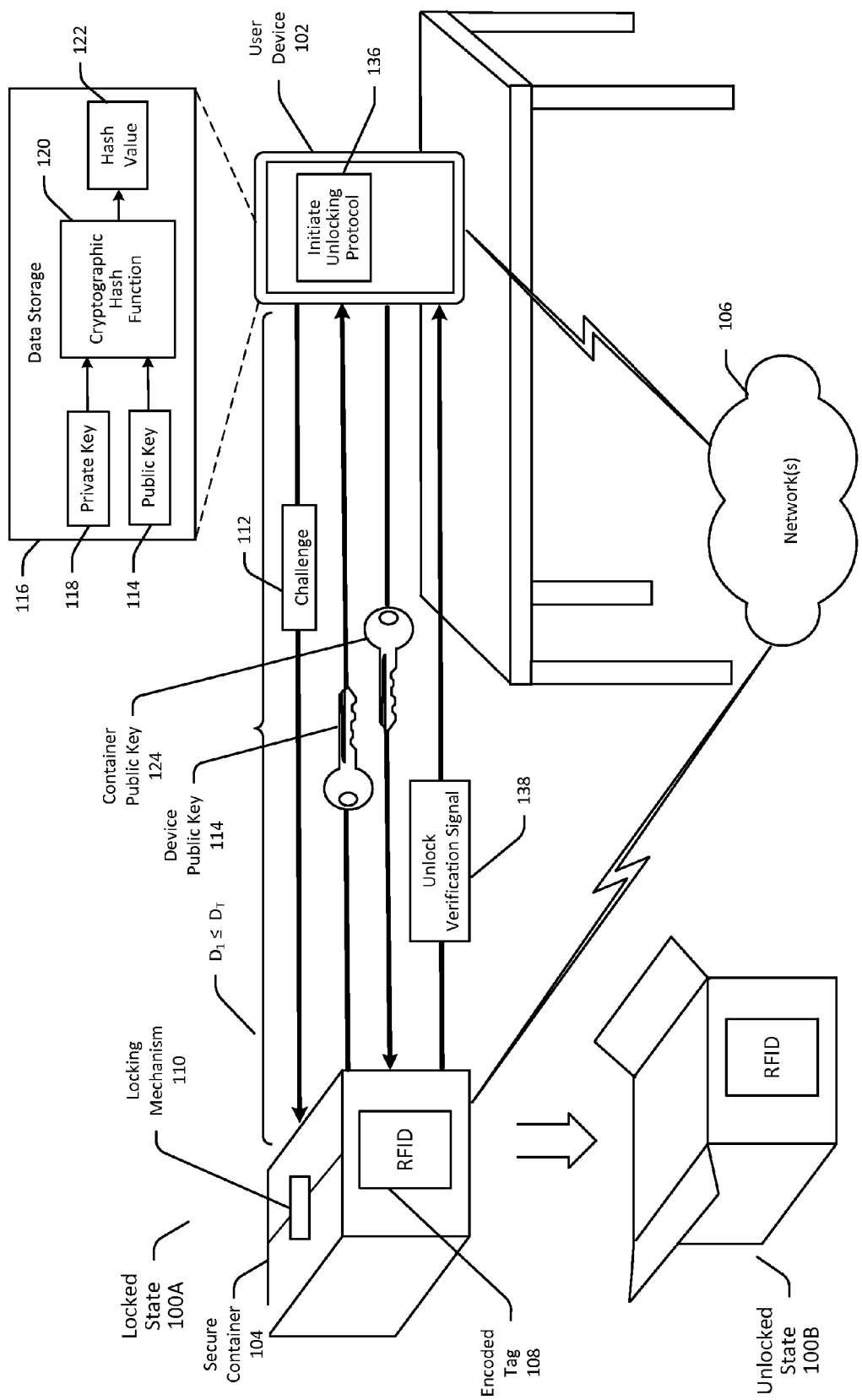
FIG. 1A is a schematic diagram illustrating deactivation of a locking mechanism of a secure container through the use of bidirectional authentication that involves the exchange of public keys between the container and a user device in accordance with one or more example embodiments of the disclosure.

This disclosure relates to, among other things, systems, apparatuses, methods, and computer-readable media for digitally unlocking a secure container. In accordance with example embodiments of the disclosure, a user device may be associated with a user profile. For example, a unique device identifier of the user device, such as a device serial number (DSN), a Media Access Control (MAC) address, or the like, may be stored at a remote server in association with a user profile identifier such as a customer identifier (ID). This association may indicate that the user device has been registered to the user profile identified by the customer ID.

The user device may store a private key (or other secret identifier) that is inaccessible except by an application executing on the device or by a trusted party such as a trusted server application executing on a remote server. The user device may provide the private key to the trusted server application after the server application is authenticated. Additionally, or alternatively, the private key may be known to the remote server at the time the private key is stored on the user device. After a product order becomes associated with the user profile, the product may be placed in a container that includes a locking mechanism that can be activated to secure the product within the container. The container may be a physical container capable of housing the product. The locking mechanism may be a mechanical locking mechanism capable of being physically locked and unlocked. A public key that pairs with the private key stored on the user device may be generated and encoded on a storage medium of the container. The storage medium may be, for example, a radio frequency identification (RFID) tag that is affixed to or embedded within the container. The RFID tag may be a passive RFID tag, an active battery-powered RFID tag, or any other suitable RFID triggered circuit. In other example embodiments, the storage medium may be other forms of non-volatile storage such as, for example, read-only memory (ROM), flash memory, ferroelectric RAM (FRAM), and so forth. When the container is brought into proximity of the user device, the user device may receive the public key from the container and may utilize the public-private key pair to authenticate the container. The container may be determined to be within proximity of the user device at any position of the container in which the container is within communicable range of the user device. Upon successful authentication, the user device may output data that causes or otherwise enables deactivation of the locking mechanism, thereby allowing the product to be retrieved from the container.

In other example embodiments, a separate private key may be stored on a storage medium of the container in lieu of, or in addition to, the private key stored on the user device. In such example embodiments, a public key that pairs with the private key stored on the storage medium of container may be provided to the user device. When the container is brought into proximity of the user device, a microcontroller or other processing unit of the container may receive the public key from the user device and utilize the pairing of the received public key and the private key stored on the storage medium of the container to authenticate the user device. Upon successful authentication, the secure container may automatically deactivate the locking mechanism or output data (e.g., an unlock code) via an input/output (I/O) interface of the container that may be used to deactivate the locking mechanism. In alternative example embodiments, a microcontroller or other processing unit of the container may compute a value using the public-private key pair and send the computed value to the user device. The user device may determine whether the computed value matches an expected value, and if so, may output data that causes or otherwise enables deactivation of the unlocking mechanism. Thus, unidirectional or bidirectional authentication between the secure container and the user device may be employed to digitally unlock the secure container.

In certain example embodiments, a vendor with whom a product order is placed may capture various device information associated with a user device used to place the order and/or various user profile information associated with a user profile with which the product order is associated. More specifically, during a communication session with the user device, an application executing on the vendor's device may capture a MAC address, a DSN, an Internet Protocol (IP) address, or the like of the user device. The vendor's device may also determine a user profile identifier (e.g., a customer ID) associated with the user profile. The vendor's device may send this information to a back-end server. The back-end server may be located remotely from the vendor device and/or the user device. In certain example embodiments, the customer ID captured by the vendor's device may be an obfuscated customer ID that is shared with the vendor and that corresponds to another customer ID for the user profile that is only known to the back-end server. Further, in certain example embodiments, an application executing on the user device may provide the device information and/or the user profile information to the back-end server in lieu of the vendor's device capturing this information and sending it to the back-end server.

The back-end server may confirm that the received device information (e.g., the MAC address, DSN, IP address, etc.) matches information stored in association with a user profile identifier that matches the received user profile identifier. In this manner, the back-end server may authenticate the user device with which the vendor device is communicating as a registered user device associated with the user profile. Upon determining that the user device with which the vendor device is communicating is a registered user device, the back-end server may further determine whether the user device possesses hardware, firmware, and/or software capabilities required to enable digital unlocking of a secure container. For example, the back-end server may determine whether the user device includes or is capable of interfacing with an RFID reader configured to interrogate an RFID tag of a secure container that may be encoded with a public key that enables, at least in part, the container to be authenticated. As another example, the back-end server may determine whether the user device includes (or can be updated with) firmware and/or software for authenticating a secure container based on a public-private key pair. In certain example embodiments, the user device from which the product order is placed need not be a registered user device capable of unlocking a secured container as long as the back-end server determines that at least one user device registered to the user profile includes hardware, firmware, and/or software required to enable digital unlocking of a secure container. A secure container may be used to deliver the product if the server determines that at least one registered user device associated with the user profile has the capability to enable digital unlocking of the secure container.

In certain example embodiments, one or more other conditions may also need to be satisfied in order for delivery of the product to occur via a secure container. For example, the delivery address specified for the product order may need to be located within a particular geographic region. For example, one or more geographic regions may have previously been determined to be associated with an increased likelihood of theft or tampering of delivered products based on criminal activity data in such region(s). As another example, one or more geographic regions may be associated with higher levels of prescription drug abuse. The back-end server may access data indicative of such high-risk geographic regions and may determine that the delivery address is located in one of these regions prior to authorizing delivery of the product via a secure container. As another example, certain times of year or times of day may be associated with a higher risk of theft or tampering. If the back-end server determines, based on an expected delivery date and/or delivery time associated with the product order, that the product is likely to be delivered during a high-risk time of year or time of day, a secure container may be used to deliver the product.

In addition, in certain example embodiments, prior to determining whether to utilize a secure container to deliver the ordered product, the back-end server may determine whether condition(s) are satisfied for authorizing delivery of the product in the first place. For example, the back-end server may determine whether a physical delivery address specified for the product order corresponds to a valid residence or office location, and may optionally further determine whether the specified delivery address matches a stored address associated with the user profile. In addition, the back-end server may utilize data obtained from third-party sources to determine whether to authorize delivery of the product to the delivery address. For example, the back-end server may access databases that store information relating to rates of criminal activity, prescription drug abuse, etc. in a geographic region that includes the delivery address. If delivery of the product to the delivery address exceeds a threshold level of risk of theft or tampering, the back-end server may refrain from authorizing delivery of the product to the delivery address altogether.

Assuming that condition(s) are met for authorizing delivery of the product to the specified delivery address using a secured container, the back-end server may proceed to generate a public key. In certain example embodiments, the back-end server may determine a private key stored on a user device registered to the user profile and utilize an asymmetric key algorithm to generate a public key that pairs with the private key. Examples of asymmetric key algorithms include, without limitation, Diffie-Hellman key exchange, Digital Signature Algorithm, RSA, and so forth. In other example embodiments, the back-end server may retrieve a pre-existing stored public key that corresponds to the private key associated with the user device. In other example embodiments, a symmetric key algorithm may be used to enable authentication of a secure container by a user device. A symmetric key algorithm may be a cryptographic algorithm that uses the same set of one or more keys to encrypt data and decrypt encrypted data. For example, the Triple Data Encryption Algorithm (Triple DES) may be used. If a symmetric key algorithm is used to enable digital unlocking of a secure container, the set of keys associated with the symmetric key algorithm may be encoded on a storage medium of the container as well as provided to the user device with respect to which the secure container can be authenticated. It should be appreciated that any number of asymmetric and/or symmetric key algorithms may be used to enable digital unlocking of a secure container.

In certain example embodiments, a service provider associated with the back-end server may ship the ordered product in the secure container. In such example embodiments, the service provider may encode a public key on a storage medium of the secure container. For example, the public key may be encoded on an RFID tag that is affixed to, embedded in, or otherwise integrated or associated with a container having a locking mechanism for securing the product within the container. As another example, the public key may be stored in non-volatile data storage of the secure container accessible by a microcontroller of the secure container. As yet another example, the public key may be encoded on a machine-readable optical label such as a barcode, a two-dimensional Quick Response (QR) code, or the like that is affixed to a surface of a secure container. As still another example, a three-dimensional machine-readable optical pattern (e.g., a three-dimensional QR code) may be embossed onto a surface of the secure container. In certain example embodiments, the public key—potentially in combination with other device information such as the MAC address or DSN of a user device—may be encrypted prior to being encoded on a storage medium of the container.

In other example embodiments, the third-party vendor may ship the ordered product in the secure container. In such example embodiments, the back-end server may send the public key to the vendor's device, and the vendor may encode the public key on a storage medium of a secure container (e.g., an RFID tag, a machine-readable optical label, a three-dimensional optical pattern, other non-volatile storage of the securable container, etc.).

The back-end server may also send the public key to the user device. The back-end server may provide the user device with (or the user device may already have stored thereon) a cryptographic hash function to execute to validate the public key in relation to the private key stored on the user device. The cryptographic hash function may be any suitable hash function that generates hash values from which it is practically infeasible to recreate the input data including, without limitation, any of the four secure hash algorithms (e.g., SHA-0 through SHA-3), the MD5 message digest algorithm, and so forth. When a secure container is brought into proximity of the user device, the user device may obtain the public key encoded in a storage medium of the container. The various alternative processes via which this may occur will be described in more detail hereinafter. The user device may then provide the public key and the private key stored on the device as inputs to the cryptographic hash function to obtain a hash value. If the hash value so obtained matches an expected value, the user device may authenticate the secure container and initiate a protocol for deactivating a locking mechanism of the secured container.

In certain additional or alternative embodiments, the user device may provide a public key to the secure container. A microcontroller of the secure container may then provide the public key and a private key stored on a storage medium of the container to a cryptographic hash function to obtain a hash value. If the hash value matches an expected value, the microcontroller may send an indication of successful authentication to the user device, which may then output an unlock code for deactivating the locking mechanism of the secure container or otherwise initiate deactivation of the locking mechanism (e.g., send a wireless unlock signal to the secure container). In still other example embodiments, the hash value computed by the microcontroller of the secure container may be provided to the user device. If the user device determines that the hash value received from the secure container matches an expected value, the user device may output an unlock code or deactivating the locking mechanism of the secure container or otherwise initiate deactivation of the locking mechanism.

In certain example embodiments, a time-to-live (TTL) value may be associated with a public key. For example, a timestamp indicating an expiration of the validity of the public key may be attached to or embedded in the data containing the public key that is stored on the storage medium of the container. As another example, the timestamp attached to or embedded in the data containing the public key may indicate a time at which the public key was generated. The user device may receive, from the back-end server, an indication of a time limit associated with a product order corresponding to the product housed in the secure container, and may perform a check to ensure that a period of time that has elapsed since the time indicated by the timestamp does not exceed the time limit. Alternatively, the back-end server may perform this check after receiving an indication from the user device that the container has been placed within proximity of the user device and may send an indication to the user device as to whether the time limit has expired. In still other example embodiments, a user of the user device may provide input to the user device indicative of a request to unlock a secure container in connection with a particular order, and the user device or the back-end server may determine whether a time limit associated with the order has expired. If a time limit for unlocking a secure container has expired, a user may be required to contact a customer service representative and provide additional information to authenticate the user prior to receiving an unlock code for deactivating a locking mechanism of the secure container.

As previously noted, in certain example embodiments, once the user device validates the public key obtained from the secure container against the private key stored on the user device, it may initiate an unlocking protocol. In certain example embodiments, this may include outputting an unlock code that a user may provide to an input interface of the secure container to cause the locking mechanism of the container to deactivate. The input interface may be a physical keypad integrated with the container, a virtual keypad rendered on a display (e.g., a liquid-crystal display (LCD) of the container, or the like. The unlock code may be displayed via a display of the user device, audibly output from a speaker of the user device, or the like. In other example embodiments, the user device may send a wireless signal to a reception component of the secure container. For example, the user device may emit a WiFi or Bluetooth signal that is received by an antenna of the secure container, converted to an electrical signal by a corresponding radio of the container, and processed by a microcontroller of the container to cause the locking mechanism of the container to deactivate. The reception component may include the antenna alone or the antenna in combination with the radio. Alternatively, the user device may emit an inaudible audio signal (e.g., a sequence of inaudible tones) that is received by the reception component of the container and that causes the locking mechanism to automatically deactivate. After or concurrently with deactivation of the locking mechanism, the secure container may send an indication to the user device indicating that the locking mechanism has been deactivated. The user device may then send an indication that the locking mechanism of the secure container has been deactivated to the back-end server, for example. Alternatively, the secure container may communicate the indication to the back-end server via one or more wireless networks using a network interface of the secure container. In this manner, the back-end server may receive confirmation that a secure container containing a product associated with a product order linked to a particular user profile has been successfully unlocked.

In certain example embodiments of the disclosure, the user device may also authenticate a user of the user device prior to initiating the unlocking protocol. More specifically, even if the user device has authenticated the secure container, the user device may determine that the user of the user device is associated with the user profile that placed the product order prior to initiating the unlocking protocol. The user device may authenticate the user in any number of ways. For example, the user device may require that the user provide identifying information such as a personal identification number (PIN), an answer to a challenge question, or the like. As another example, the user device may capture an image of the user using an internal or peripheral camera and may execute a facial recognition algorithm on the image to authenticate the user. Additionally, or alternatively, the user device may utilize other biometric data (e.g., fingerprint data, iris data, etc.) to authenticate the user. As yet another example, the user device may process voice data indicative of an utterance of the user to authenticate the user. Authenticating the user may protect against potential misuse of the product by a member of the user's household, for example. It should be appreciated that the above examples of ways to authenticate a user are merely illustrative and not exhaustive.

In certain example embodiments, the secure container may be delivered to a locker or other holding area accessible using authentication credentials. In such example embodiments, a code may be provided in connection with a product order and the code may be used to deactivate the locking mechanism of the container. For example, the code may be entered into an I/O interface of the secure container. In certain example embodiments, the code may be an alphanumeric string that is relatively easy for a user to remember. The code may have a TTL value associated therewith. Further, in certain example embodiments, even after a secure container has been successfully authenticated with respect to a user device, a code as described above and distinct from the unlock code described earlier may need to be provided to the user device and/or the secure container prior to deactivating the locking mechanism.

In certain example embodiments, the unlocking protocol may fail to deactivate the locking mechanism. For example, a wireless signal sent from the user device may not be received by the secure container or may become too attenuated to cause deactivation of the locking mechanism. Alternatively, a code displayed or audibly output by the user device may be incorrectly inputted to an I/O interface of the secure container a threshold number of times causing the secure container to prevent unlocking of the locking mechanism using a code. In other example embodiments, the user device may fail to successfully authenticate the secure container and/or the secure container may fail to successfully authenticate the user device, in which case, the digital unlocking protocol may not be initiated in the first place.

To address the possibility that the locking mechanism of the secure container cannot be digitally unlocked, a physical key may be provided that allows the locking mechanism to be unlocked through user action. The physical key may be a key capable of being inserted into the mechanical locking mechanism or may be a key fob, key card, or the like capable of communicating with a key reader device of the secure container to unlock the locking mechanism when brought into communicable range of the key reader device. The key fob, key card, or the like may communicate with the key reader device using RFID, WiFi, Bluetooth, Near Field Communication (NFC), or any other suitable wireless technology. In certain example embodiments, the physical key (e.g., a key fob, key card, or the like) may only become activated after a time-based or location-based determination is made. For example, the physical key may become activated after a determination has been made that the secure container has been delivered to the correct delivery address. A delivery service may report delivery of the secure container to the back-end server, the user device may send a notification to the back-end server when the secure container is brought within communicable range of the user device, and so forth. In other example embodiments, the physical key may become activate based on another type of determination such as, for example, a determination that authentication of the secure container with respect to the user device has failed, a determination that the unlocking protocol has been initiated but has failed, or the like.

The secure container may also include one or more sensors for detecting potential theft or tampering of the container. The sensor(s) may include, without limitation, an accelerometer, a gyroscope, a temperature sensor, a force sensor (e.g., a strain gauge, a load cell, a piezoelectric sensor, a sensor that incorporates one or more of the foregoing, etc.), and so forth. A microcontroller or other processing component of the secure container may evaluate sensor data captured by the one or more sensors to determine whether the sensor data is indicative of potential theft or tampering. For example, the microcontroller may evaluate data received from a force sensor to determine whether a force in excess a threshold permitted force is being applied to the container. As another example, the microcontroller may evaluate data received from a temperature sensor to determine whether the container is being subjected to a temperature that falls outside of acceptable temperature limits. As yet another example, the microcontroller may evaluate data received from an accelerometer and/or a gyroscope to determine whether the container is being subjected to acceleration or vibration in excess of a threshold level of acceleration or vibration.

If the microcontroller determines that the sensor data is outside of acceptable limits, it may generate an alert message and direct a network interface of the secure container to send the alert message to a designated recipient via, for example, a cellular network, a WiFi network, or the like. The recipient may be, for example, a network address of a service provider with whom the product order corresponding to the product housed in the container was placed. The service provider may then provide an indication of the alert message to a user profile with which the product order is associated. In addition, in certain example embodiments, upon detection of potential theft or tampering, the container may output a visual and/or audible alarm, initiate a process for destroying or rendering inactive the product housed in the container, permanently disable the capability to deactivate the locking mechanism of the container, or the like.

In certain example embodiments, the secure container may be equipped with a Global Positioning System (GPS) or other satellite-based navigation receiver. Satellite signals may be received and processed by the GPS receiver to determine a location of the container. If the location of the container is determined to be more than a threshold distance from a delivery address associated with the product order, an alert message may be generated. This determination may be made by a processing component of the GPS receiver or by a microcontroller of the container that is distinct from the processing component of the GPS receiver. Alternatively, the location of the container determined by the GPS receiver may be provided to a back-end server configured to determine whether the container location is within a threshold distance of the delivery address or to determine, based on third-party data, whether the container is located in a geographic region associated with a high likelihood of criminal activity, prescription drug abuse, or the like. If the back-end server determines that the container location is not within the threshold distance or is within an unsafe geographic region, it may send an instruction to the container to output an alarm, destroy or render inactive the product housed in the container, permanently disable the capability to unlock the locking mechanism of the container, or the like. Further, if a back-end server receives an alert message indicating potential theft or tampering with a secure container or a secure container location that is more than a threshold distance from a delivery location, the back-end server may send a notification to a third-party service (e.g., a delivery service). The notification may indicate that the alert message was received and may provide a location (e.g., GPS coordinates) associated with the secure container. The delivery service may then retrieve the secure container on behalf of the vendor or a third-party fulfilling the product order on behalf of the vendor.

Example embodiments of the disclosure provide a number of technical features, technical effects, and improvements to technology. For example, in accordance with example embodiments of the disclosure, an ordered product may be delivered in a secure (locked) container that may be unlocked—via an unlock code or unlock signal provided by a user device that is known to be associated with a user profile that placed the order—only upon authentication of the container with respect to the user device. In this manner, theft or misuse of the ordered product by an unintended recipient may be minimized or avoided. In particular, this disclosure provides a technical effect of secure product delivery by utilizing: 1) a digital authentication protocol involving, for example, a public-private key pair where the public key is encoded on a storage medium of a container housing a product and the private key is stored on a user device in order to authenticate the container with respect to the user device and 2) an unlocking protocol initiated by the user device to deactivate a locking mechanism of the container upon authentication of the container by the user device. In addition, the secure container may include various sensor(s) that capture sensor data and processing capabilities to generate an alarm or alert message or take other action to minimize the possibility of theft or misuse of the product secured in the container if the sensor data exhibits anomalous characteristics. Thus, the technical effect of secure product delivery provided by embodiments of the disclosure yields an improvement to existing package delivery technologies. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Embodiments

Illustrative embodiments for authenticating a secure container and initiating an unlocking protocol for deactivating (e.g., unlocking) a locking mechanism of the container will be described hereinafter. FIG. 1A is a schematic diagram illustrating deactivation of a locking mechanism of a secure container through the use of bidirectional authentication that involves the exchange of public keys between the container and a user device in accordance with one or more example embodiments of the disclosure. FIG. 1B is a schematic diagram illustrating authentication of a secured container with respect to a user device and outputting of an unlock code by the user device for deactivating a locking mechanism of the secure container in accordance with one or more example embodiments of the disclosure. FIG. 1C is a schematic diagram illustrating authentication of a secure container by a user device and transmission of an wireless unlock signal from the user device to the container to deactivate a locking mechanism of the secure container in accordance with one or more example embodiments of the disclosure. These illustrative embodiments will be described in the context of an example use case. It should be appreciated that the example use case is described merely for explanatory purposes and that example embodiments of the disclosure may be applicable to any of a variety of possible use cases.

In example embodiments of the disclosure, a user device 102 may be provided. The user device 102 may include one or more processors, one or more memory devices, non-volatile data storage, one or more input/output (I/O) interfaces, one or more network interfaces, one or more sensors, one or more radios, one or more antennas, and so forth. The non-volatile data storage may store an operating system, a database management system (DBMS), and one or more applications, program modules, or the like executable on the device 102. The I/O interface(s) may be configured to interface with any of a variety of peripheral I/O devices or I/O devices integrated with the device 102. Such I/O devices may include a microphone for receiving audio data, a speaker for outputting audio data, a display for outputting visual information, a touch sensor (capacitive and/or resistive) for enabling touch-based interactions with the display, and so forth. While the user device 102 may be a mobile device such as a smartphone, tablet, or the like, in certain example embodiments, the user device 102 may be designed for non-mobile user interaction. For example, the user device 102 may be located in a communal living space (e.g., a kitchen) such that multiple members of a household may interact with the device 102.

In certain example embodiments, the user device 102 may be configured to enable interaction between a user and a virtual assistant. The virtual assistant may be a network-based service executing on one or more back-end servers (such as any of the server(s) described herein). The virtual assistant may provide a variety of types of functionality such as the capability to recognize speech, perform search queries based on the recognized speech, output visual and/or audible information indicative of the results of the search queries, initiate playback of audio and/or video data, execute product orders, and so forth. Functionality of the virtual assistant may be triggered upon receipt of audio data by the user device 102 that includes data corresponding to a predetermined utterance (e.g., a predetermined wake word). An illustrative configuration of the user device 102 will be described in more detail in reference to FIG. 6.

In an example use case, a user may utilize the user device 102 to place an order for a product such as a prescription drug. For example, in an emergency medical situation, a user may launch an application on the user device 102 that enables a virtual patient counseling video session to be initiated with a prescribing physician. The physician may assess the user's health condition and issue a prescription during the counseling session. In an example scenario, various sensors (e.g., a temperature sensor, a blood pressure monitor, a heart rate sensor, etc.) may collect data relating to the user's health condition and transmit the data to the user device 102. The virtual assistant may transmit the sensor data to a device utilized by the physician upon receiving authorization from the user. The sensor data may be presented, for example, as an overlay on the user device 102 and the physician's device during the video session.

Upon issuing the prescription, the video call may be transferred to a pharmacist. In an example scenario, the pharmacist may join the existing video session using a device that enables video communication sessions. After briefing the user on dosage and intake requirements for the prescribed drug and confirming that there is no risk of adverse drug interactions, the pharmacist may place an order for the prescription drug. More specifically, an order for the prescription drug may be linked to a user profile associated with the user. If the user authorizes delivery of the prescription drug in a secure container and a back-end server determines that the product order is eligible for delivery via a secure container according to example embodiments of the disclosure, a process may be initiated for generating a public key that pairs with a private key of the user device 102 to enable the secure container to be unlocked when placed in proximity of the user device 102. In other example embodiments, the type of product ordered may mandate delivery via a secure container. For example, certain controlled substances may only be delivered via a secure container as described herein.

More specifically, in an example scenario, the device utilized by the pharmacist may capture various device information associated with the user device 102 and/or various user profile information associated with the user profile to which the prescription drug order is linked. For example, a MAC address, a DSN, an IP address, or the like of the user device 102 may be determined. The pharmacist's device may also determine a user profile identifier (e.g., a customer ID) associated with the user profile. The pharmacist's device may send this information to a remote back-end server. A back-end server, as described herein, may have the illustrative configuration of a back-end server 602 described in more detail later in this disclosure in reference to FIG. 6. In certain example embodiments, the customer ID captured by the pharmacist's device may be an obfuscated customer ID that is shared with the pharmacist and that corresponds to another customer ID for the user profile that is only known to the back-end server. Further, in certain example embodiments, an application executing on the user device 102 may provide the device information and/or the user profile information to the back-end server in lieu of the pharmacist's device capturing this information and sending it to the back-end server.

The back-end server may confirm that the received device information (e.g., the MAC address, DSN, IP address, etc.) matches information stored in association with a user profile identifier that corresponds to the received user profile identifier. In this manner, the back-end server may authenticate the user device 102 with which the pharmacist's device is communicating as the user device 102 that has been registered to the user profile. Upon determining that the user device 102 with which the pharmacist's device is communicating is a registered user device, the back-end server may further determine whether the user device 102 possesses hardware, firmware, and/or software capabilities required to enable digital unlocking of a secure container 104. For example, the back-end server may determine whether the user device 102 includes or is capable of interfacing with hardware (e.g., an RFID reader) that enables an authentication protocol to be performed. As another example, the back-end server may determine whether the user device 102 includes (or can be updated with) firmware and/or software for authenticating the secure container 104 based on, for example, a public-private key pair. In certain example embodiments, the user device 102 may not be device used to place the product order. Rather, the user device 102 may be another user device registered in connection the user profile with which the product order is associated, and which the back-end server determines includes hardware, firmware, and/or software required to enable digital unlocking of the secure container 104.

In certain example embodiments, one or more other conditions may also need to be satisfied in order for delivery of the product (e.g., the prescription drug) to occur via the secure container 104. For example, the delivery address specified for the product order may need to be located within a particular geographic region such as a geographic region determined to be associated with an increased likelihood of theft or tampering of delivered products, an increased rate of prescription drug abuse, or the like. As another example, certain times of year or times of day may be associated with a higher risk of theft or tampering. If the back-end server determines, based on an expected delivery date and/or delivery time associated with the product order, that the product is likely to be delivered during a high-risk time of year or time of day, the secure container 104 may be used to deliver the product. As yet another example, the product may need to have a monetary value above a certain threshold for the secure container 104 to be used to deliver the product.

In addition, in certain example embodiments, prior to determining whether to utilize the secure container to deliver the ordered product (e.g., the prescription drug), the back-end server may determine whether other condition(s) are satisfied for authorizing delivery of the product in the first place. For example, the back-end server may determine whether a physical delivery address specified for the product order corresponds to a valid residence or office location, and may further determine whether the specified delivery address matches a stored address associated with the user profile. In addition, the back-end server may access databases that store information relating to rates of criminal activity, prescription drug abuse, etc. in a geographic region that includes the delivery address. If the back-end server determines that delivery of the product to the delivery address exceeds a threshold level of risk of theft or tampering based on the accessed information, the back-end server may refrain from authorizing delivery of the product to the delivery address. For example, if the delivery address is within a geographic region known to have a high rate of abuse of the prescription drug that was ordered, the order may be canceled and/or the user may be required to fulfill the prescription at a local pharmacy.

Assuming that condition(s) are met for authorizing delivery of the product to the specified delivery address and using the secure container 104, the back-end server may proceed to generate the public key 114. In certain example embodiments, the back-end server may determine a private key 118 stored on the user device 102 and utilize an asymmetric key algorithm to generate the public key 114 that pairs with the private key 118. In other example embodiments, the back-end server may retrieve a pre-existing stored public key 114 that corresponds to the private key 118 associated with the user device 102.

In an example scenario, a service provider associated with the back-end server may ship the prescription drug. In such example embodiments, the service provider may encode the public key 114 on a storage medium of a securable container 104. For example, the public key 114 may be encoded on an RFID tag 108 that is affixed to, embedded in, or otherwise integrated or associated with the secure container 104. The secure container 104 may have a locking mechanism 110 for securing the prescription drug product within the container 104. Any suitable locking mechanism 110 may be used. As another example, the public key 114 may be stored in non-volatile data storage of the secure container 104 accessible by a microcontroller of the secure container 104. As yet another example, the public key 114 may be encoded on a machine-readable optical label such as a barcode, a two-dimensional QR code, or the like that is affixed to a surface of the secure container 104. As still another example, a three-dimensional machine-readable optical pattern (e.g., a three-dimensional QR code) may be embossed onto a surface of the secure container 104. In certain example embodiments, the public key 114—potentially in combination with other device information such as the MAC address or DSN of the user device 102—may be encrypted prior to being encoded on a storage medium of the container 104.

In another example scenario, the prescription drug may be shipped from a third-party pharmacy location. In such an example scenario, the back-end server may send the public key 114 to the pharmacist's device, and the public key 114 may be encoded on a storage medium of the secure container 104 (e.g., the RFID tag 108, a machine-readable optical label, a three-dimensional optical pattern, other non-volatile storage of the securable container 104, etc.).

The back-end server may also send the public key 114 to the user device 102. The back-end server may provide the user device 102 with (or the user device 102 may already have stored thereon) a cryptographic hash function 120 to execute to validate the public key 114 in relation to the private key 118 stored on the user device 102. The cryptographic hash function 120 may be any suitable hash function that generates hash values from which it is practically infeasible to recreate the input data including, without limitation, any of the four secure hash algorithms (e.g., SHA-0 through SHA-3), the MD5 message digest algorithm, and so forth. The private key 118 and the cryptographic hash function 120 may be stored in data storage 116 of the user device 102. In certain example embodiments, the private key 118 may be stored in a secured portion of the data storage 116 that is only accessible by trusted applications executing on the user device 102 and/or by trusted applications executing on the back-end server via a secure network connection. Further, the private key 118 may be written to a portion of the data storage 116 for which the write capability has been removed.

Continuing with the example use case introduced earlier, the secure container 104 may house the prescription drug and may be delivered to a delivery address indicated in the prescription drug order, which may be an address associated with the user profile to which the order is linked. The container 104 may be delivered in a locked state 100A in which the locking mechanism 110 is activated (e.g., locked). In certain example embodiments, a user may launch an application on the user device 102 that is configured to execute an authentication protocol to attempt to authenticate the container 104. The user may, for example, launch the application via a voice-based interaction with a virtual assistant accessible through the user device 102. In other example embodiments, the user may launch the application via touch-based interactions with the user device 102.

The virtual assistant may instruct the user to place the container 104 within proximity of the user device 102 and notify the virtual assistant when this action is completed. This instruction may be an audible instruction outputted from a speaker of the user device 102 or a visual instruction displayed on a display of the user device 102. In certain example embodiments, the virtual assistant may indicate that the container 104 should be placed within a threshold distance $D_T$ (e.g., 10 feet) of the user device 102, which may be a distance associated with a boundary of a communicable range associated with the user device 102. The user may notify the virtual assistant that the container 104 has been placed within proximity of the user device 102 via an audible input to the user device 102 or a touch-based interaction with the user device 102. The container may be placed at a distance $D_1$ from the user device 102 that is less than or equal to the threshold distance $D_T$. It should be appreciated that although example embodiments of the disclosure are described as involving interaction with a virtual assistant, in certain example embodiments, an application executing on the user device 102 may be configured to authenticate the container 104 and initiate the unlocking protocol without utilizing the virtual assistant. Such a client-side application may, however, nonetheless interact with a server-side application to, for example, obtain data such as a time limit that is associated with a product order and within which the secure container 104 containing the product can be unlocked.

In certain example embodiments, the user device 102 may be configured to automatically determine when the secure container 104 is in proximity of the user device 102 (e.g., within a communicable range of the user device 102). For example, the user device 102 may detect a network transmission received from the secure container 104 (e.g., a WiFi probe frame). In certain example embodiments, the user device 102 may receive the network transmission from the secure container 104 in response to a network transmission broadcast by the user device 102 (e.g., a WiFi beacon signal). In yet other example embodiments, the user device 102 may receive a network transmission from the secure container 104 as part of initiation of a handshaking protocol (e.g., a request associated with a Bluetooth handshaking protocol). In still other example embodiments, the secure container 104 may be determined to be within proximity of the user device 102 based on wireless signature fingerprinting, respective GPS locations of the secure container 104 and the user device 102, or the like. Further, in certain example embodiments, WiFi or other networking credentials may be stored on a storage medium (e.g., an RFID triggered circuit of the secure container 104). The RFID triggered circuit may provide the WiFi credentials to a WiFi network access device to enable access to a WiFi network via which a WiFi direct protocol may be established with the user device 102. In such example embodiments, the user device 102 a set-top box, a content streaming device, or the like associated with a customer profile with which a product order for a product housed in the container 104 is associated.

After the secure container 104 is brought into proximity of the user device 102, the user device may obtain the public key 114 encoded in a storage medium of the container 104 via a challenge/response mechanism. More specifically, the user device 102 may issue a challenge 112 to the container 104 and may receive the public key 114 in response to the challenge 112. For example, in those example embodiments in which the public key 114 is encoded on an RFID triggered circuit (e.g., the RFID tag 108 that may be affixed to, embedded in, or otherwise associated with the container 104), an RFID reader of the user device 102 may broadcast an interrogation signal 112. Upon detection of the interrogation signal 112, the RFID tag 108 may respond with the public key 114 encoded on the tag 108. Upon receipt of the public key 114, the user device 102 may then provide the public key 114 and the private key 118 stored on the device 102 as inputs to the cryptographic hash function 120 to obtain a hash value 122. If the hash value 122 so obtained matches an expected value, the user device 102 may authenticate the secure container 104 and initiate a protocol for deactivating the locking mechanism 110 of the secure container 104.

It should be appreciated that an RFID interrogation signal and encoding of the public key 114 on the RFID tag 108 is merely an example challenge/response mechanism that may be used to authenticate the container 104 with respect to the user device 102. In another example embodiment, the public key 114 may be encoded in a machine-readable optical label affixed to the container 104 or encoded in a physical pattern (e.g., a 3-dimensional QR code) embossed on a surface of the container 104. The machine-readable label or pattern may be positioned in a field-of-view of a camera or other imaging device integrated with the user device 102 or communicatively coupled thereto. The camera or other imaging device may scan (e.g., generate an image) of the label or pattern and process the scanned image to determine the public key 114. In still other example embodiments, the user device 102 may establish a wireless communication link with the container 104 (e.g., a Bluetooth pairing), and the container 104 may transmit the public key 114 to the user device 102 over the wireless link. In such example embodiments, the public key 114 may be stored in non-volatile storage of the container 104 that is accessible by a microcontroller or other processing unit of the container 104.

In other example embodiments, a symmetric key algorithm may be used to enable authentication of the secure container 104 by the user device 102. A symmetric key algorithm may be a cryptographic algorithm that uses the same set of one or more keys to encrypt data and decrypt encrypted data. For example, the Triple DES algorithm may be used. If a symmetric key algorithm is used to enable digital unlocking of the secure container 104, the set of keys associated with the symmetric key algorithm may be encoded on a storage medium of the container 104 (e.g., on the RFID tag 108) as well as provided to the user device 102 with respect to which the secure container 104 can be authenticated.

Triple DES is an example symmetric key algorithm in which three DES keys are generated. A particular order of encrypt/decrypt operations may be performed using the three keys to encrypt a message to generate an encrypted message. For example, the message may be encrypted using a first key to generate a first result, the first result may be decrypted using a second key to generate a second result, and the second result may be encrypted using a third key to generate the encrypted message. The encrypted message may then be decrypted by applying the three keys in accordance with a reverse order of operations. In particular, a first decrypt operation may be performed on the encrypted message using the first key, a second encrypt operation may then be performed using the second key, and a third decrypt operation may then be performed using the third key to reveal the message.

Various keying options may be used including, for example, a first keying option according to which all three keys are independent, a second keying option in which the first and second keys are independent and the first and third keys are the same, or a third keying option in which all three keys are identical. The third keying option for Triple DES may be equivalent to DES. Further, for both encryption of a message to generate an encrypted message and decryption of the encrypted message, the middle operation may be the reverse of the first and last operations (e.g., for encryption, the middle operation may be a decrypt operation while the first and last operations may be encrypt operations). This may improve the strength of the algorithm when using the second keying option and may provide backward compatibility with DES when using the third keying option.

In certain example embodiments, the back-end server may use a set of symmetric key(s) and an associated symmetric key algorithm to encrypt a message (e.g., a character string) to generate an encrypted message. For example, the back-end server may use the Triple DES algorithm to encrypt the message. The set of symmetric key(s) and the encrypted message may be encoded on a storage medium of a secure container such as, for example, on the RFID tag 108 affixed to or embedded in the secure container 104. In addition, the back-end server may send the original unencrypted message to a user device that will be used to authenticate the secure container 104 (e.g., the user device 102). When the secure container 104 is brought into proximity of the user device 102, the secure container 104 may send the set of symmetric key(s) and the encrypted message to the user device 102, which may be use the key(s) to execute an associated symmetric key algorithm (e.g., Triple DES) to decrypt the encrypted message to obtain a result. The user device 102 may then compare the result to the original unencrypted message received from the back-end server, and if they match, may output data to deactivate a locking mechanism of the secure container 104.

In other example embodiments, the back-end server may send the set of symmetric key(s) and the encrypted message to the user device 102 and may encode the original message on a storage medium of the secure container (e.g., the RFID tag 108). In such example embodiments, the user device 104 may provide the key(s) and the encrypted message to the secure container 102, which may include a microcontroller configured to utilize the key(s) to execute a corresponding symmetric key algorithm on the encrypted message to obtain a result. The microcontroller may compare the result thus obtained to the original message encoded on the storage medium of the secure container 104, and if they match, may deactivate the locking mechanism 110 of the secure container 104 or may send an indication to the user device that a match has been detected to cause the user device 102 to output data to enable deactivation of the locking mechanism 110. In still other example embodiments, the back-end server may send the set of symmetric key(s) and the original message to the user device 102 and may encode the encrypted message on a storage medium of the secure container 104 (e.g., the RFID tag 108). When the secure container 104 is brought into proximity of the user device 102, the user device 102 may send the set of symmetric key(s) to the secure container 104, and a microcontroller of the secure container 104 may execute the corresponding symmetric key algorithm on the encrypted message using the set of key(s) to obtain a result value. The secure container 104 may then send the result value to the user device 102, which may compare the result value to the original message, and if they match, may output data to deactivate the locking mechanism 110 of the secure container 102. It should be appreciated that the above examples of authentication schemes are merely illustrative and not exhaustive.

In certain example embodiments, multiple user devices present at the delivery address may each store a respective private key and/or a respective public key. Further, in certain example embodiments, multiple user devices may store the same private key and/or the same public key. In such example embodiments, any of the multiple user devices described above may be configured to authenticate the secure container 104. In other example embodiments, the combination of the multiple private and/or public keys collectively stored on the multiple user devices may be used to authenticate the secure container 104, in which case, the multiple user devices may need to be present at the delivery address to authenticate the secure container 104. For example, if a first registered user device is non-functional and incapable of authenticating the secure container 104 when the secure container 104 arrives at the delivery address, a second registered user device (or some combination of other user devices) may store the appropriate public and/or private key(s) required to authenticate the secure container 104.

In certain example embodiments, a TTL value may be associated with the public key 114. For example, a timestamp indicating an expiration of the validity of the public key 114 may be attached to or embedded in the data containing the public key 114 that is stored on the storage medium of the container 104. As another example, the timestamp attached to or embedded in the data containing the public key 114 may indicate a time at which the public key 114 was generated. The user device 102 may receive, from a back-end server, an indication of a time limit associated with a product order corresponding to the product housed in the container 104, and may perform a check to ensure that a period of time that has elapsed since the time indicated by the timestamp does not exceed the time limit. Alternatively, the back-end server may perform this check after receiving an indication from the user device 102 that the container 104 has been placed within proximity of the user device 102 and may send an indication to the user device 102 as to whether the time limit has expired. In still other example embodiments, a user of the user device 102 may provide input to the user device 102 indicative of a request to unlock a container in connection with a particular order, and the user device 102 or the back-end server may determine whether a time limit associated with the order has expired. If a time limit for unlocking the secure container 104 has expired, a user may be required to contact a customer service representative and provide additional information to authenticate the user prior to receiving an unlock code for deactivating the locking mechanism 110 of the secure container 104.

As previously noted, once the user device 102 validates the public key 114 obtained from the secure container 104 against the private key 118 stored on the user device 102, it may initiate an unlocking protocol. In certain example embodiments, this may include transmitting a public key 124 to the container 104. Upon receipt of the public key 124, the container 104 may determine whether the public key 124 corresponds to a private key (not shown) stored on a storage medium of the container 104. If the container 104 (or more specifically, a microcontroller of the container 104) determines that the public key 124 corresponds to its stored private key, the locking mechanism 110 may be deactivated and the container 104 may transition to an unlocked state 100B in which the container 104 can be opened and the product housed therein (e.g., the prescription drug) retrieved. Alternatively, the container 104 may send an indication to the user device 102 that the user device 102 has been authenticated, and the user device 102 may output data (e.g., an unlock code, a wireless signal, etc.) that enables the locking mechanism 110 to be deactivated. The container 104 may determine that the public key 124 corresponds to its stored private key if a cryptographic hash function executed on the public key 124 and the stored private key yields a hash value that corresponds to an expected value. In other example embodiments, the container 104 may communicate the computed hash value to the user device 102. If the user device 102 determines that the computed value received from the container 104 corresponds to an expected value, the user device 102 may output data that enables deactivating the locking mechanism 110 of the container 104. A back-end server that generates the public key 114 may also generate the container public key 124 and provide the key 124 to the user device 102. While bi-directional authentication between the container 104 and the user device 102 is depicted in FIG. 1A, it should be appreciated that only unidirectional authentication may be employed in certain example embodiments (e.g., the user device 102 receives the public key 114 and authenticates the container 104 or the container 104 receives the public key 124 and authenticates the user device 102).

In certain example embodiments, after or concurrently with deactivation of the locking mechanism 110, the secure container 104 may send an indication (e.g., an unlock verification signal 138) to the user device 102 indicating that the locking mechanism 110 has been deactivated. The user device 102 may then send an indication that the locking mechanism 110 of the secure container 104 has been deactivated to the back-end server, for example. Alternatively, the secure container 104 may communicate the indication to the back-end server via one or more networks 106 using a network interface of the secure container 104. In this manner, the back-end server may receive confirmation that the secure container 104 containing a product associated with a product order linked to a particular user profile has been successfully unlocked. More generally, in certain example embodiments, networking credentials (e.g., WiFi credentials) may be stored on a storage medium of the container 104 to allow the container 106 to communicate with the back-end server while in proximity to a WiFi router or other network access device that may be present at the delivery address or otherwise associated with the user device 102. In addition to, or in lieu of WiFi credentials, any other networking credentials may be stored on the storage medium of the container 104 including, without limitation, a customer's mesh networking credentials, ZigBee, Z-Wave, or networking credentials associated with any other networking protocol that may be used by devices to communicate with one another within, for example, a home environment.

Referring now to FIG. 1B, in other example embodiments, the user device 102 may initiate an unlocking protocol by outputting an unlock code that a user may provide to an input interface 132 of the secure container 104 to cause the locking mechanism 110 of the container 104 to deactivate. The input interface 132 may be a physical keypad integrated with the container 104, a virtual keypad rendered on a display (e.g., a liquid-crystal display (LCD) of the container 104, or the like. In certain example embodiments, the locking mechanism 110 may be a combination key lock capable of being unlocked upon manual entry of the unlock code. The unlock code may be displayed as part of a user interface 126 rendered on a display of the user device 102, provided as part of audio data 128 outputted from a speaker 130 of the user device 102, or the like. In certain example embodiments, the user device 102 may determine whether accessibility feature(s) are being accessed on the user device 102 and may output the code as the audio data 128 based on such a determination. For example, a user of the user device 102 may have selected a device setting that causes data to be audibly output rather than visually rendered on a display of the user device 102. In such an example use case, the user device 102 may output the unlock code in the form of the audio data 128. In still other example embodiments, the unlock code may be output by the user device 102 in the form of haptic output using a haptic generator.

Referring now to FIG. 1C, in still other example embodiments, the user device 102 may send a wireless unlock signal 134 to a reception component of the secure container 104. For example, the user device 102 may emit a WiFi or Bluetooth signal that is received by an antenna of the secure container 104, converted to an electrical signal by a corresponding radio of the container 104, and processed by a microcontroller of the container 104 to cause the locking mechanism 110 of the container 104 to deactivate. The reception component may include the antenna alone or the antenna in combination with the radio. Alternatively, the user device 102 may emit an inaudible audio signal 134 (e.g., a sequence of inaudible tones) that is received by the reception component of the container 104 and that causes the locking mechanism 110 to automatically deactivate.

In certain example embodiments of the disclosure, the user device 102 may also authenticate a user of the user device 102 prior to initiating the unlocking protocol. More specifically, even if the user device 102 has authenticated the secure container 104 and/or the container 104 has authenticated the user device 102, the user device 102 may need to determine that the user of the user device 102 is associated with the user profile that placed the product order prior to initiating the unlocking protocol. The user device 102 may authenticate the user in any number of ways. For example, the user device 102 may require that the user provide identifying information such as a PIN, an answer to a challenge question, or the like. As another example, the user device 102 may capture an image of the user using an internal or peripheral camera and may execute a facial recognition algorithm on the image to authenticate the user. Additionally, or alternatively, the user device 102 may utilize other biometric data (e.g., fingerprint data, iris data, etc.) to authenticate the user. As yet another example, the user device 102 may process voice data indicative of an utterance of the user to authenticate the user. Authenticating the user may protect against potential misuse of the product by a member of the user's household (e.g., abuse of the prescription drug by someone to whom the drug was not prescribed).

The container 104 and/or the user device 102 may each be configured to communicate with one or more remote servers (e.g., the back-end server previously described) via one or more networks 106. The network(s) 106 may include any of the example types of networks described later in this disclosure in reference to the network(s) 608. For example, the user device 102 may be configured to communicate with one or more remote servers via the network(s) 106 to obtain data (e.g., the public key 114, the public key 124, etc.), to enable interaction with a virtual assistant, and so forth. Similarly, the container 104 may be configured to communicate with one or more remote servers via the network(s) 106 to, for example, send an alert message indicative of potential theft or tampering with the container 104, as will be described in more detail later in this disclosure.

Illustrative Secured Container Configuration

Figure 2:
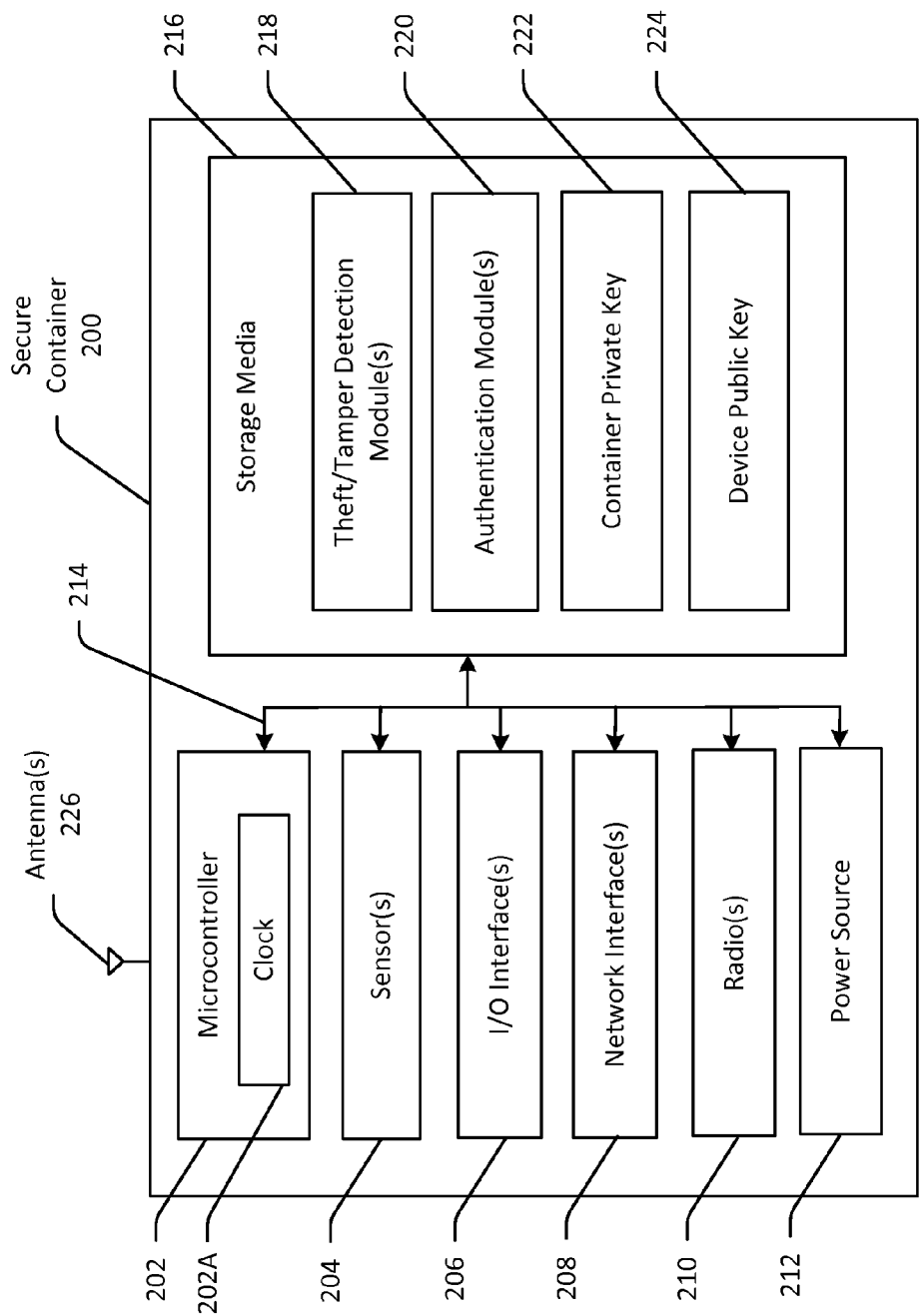
FIG. 2 is a schematic diagram of an illustrative configuration of a secure container in accordance with one or more example embodiments of the disclosure.

FIG. 2 is a schematic diagram of an illustrative configuration of a secure container 200 in accordance with one or more example embodiments of the disclosure. In an example embodiment, the secure container 104 may correspond to the secure container 200. In an illustrative configuration, the container 200 may include one or more processing units 202 (e.g., a microcontroller), one or more sensors or sensor interface(s) 204, one or more input/output ("I/O") interface(s) 206, one or more network interfaces 208, one or more radios 210, a power source 212, one or more antennas 226, and one or more storage media 216. The one or more processing units 202 may, in turn, include one or more clocks 202A for generating timing data. The network interface(s) 208 may, in turn, include one or more wireless network controllers such as, for example, a Bluetooth controller, a WiFi controller, or the like. The power source 212 may include any suitable power generation component such as, for example, a battery. Even if the secure container 200 does not include the other hardware components depicted in FIG. 2, the secure container 200 may nonetheless include the power source 212 as part of an active battery-assisted RFID tag affixed to or embedded in the secure container 200. The container 200 may further include one or more buses 214 that functionally couple various components of the container 200. These various components of the container 200 will be described in more detail hereinafter.

Figure 6:
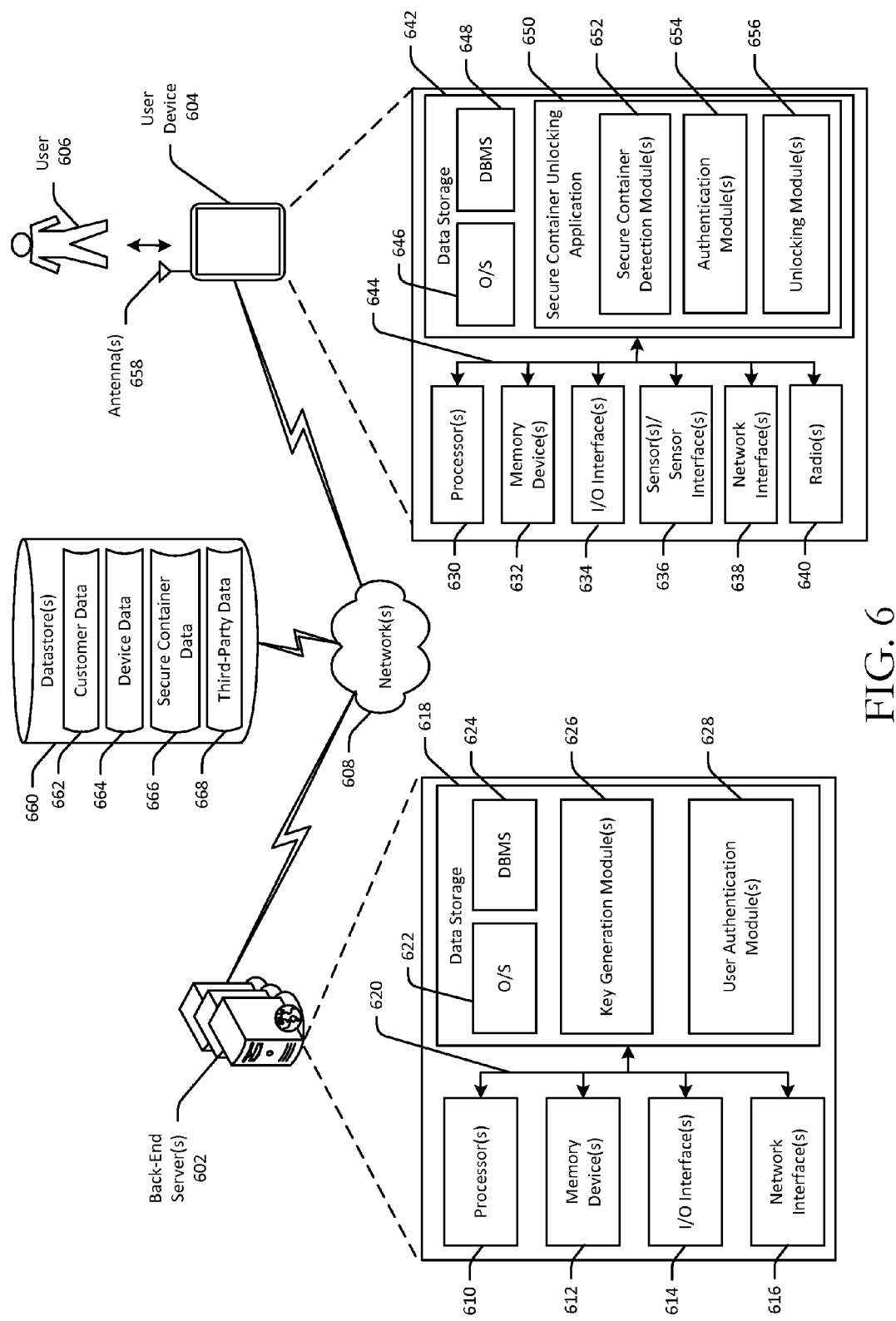
FIG. 6 is a schematic diagram of an illustrative networked architecture in accordance with one or more example embodiments of the disclosure.

The processing unit(s) 202 may include any of the example types of processors described in reference to processor(s) 610 depicted in FIG. 6. Similarly, the bus(es) 214 may include any of the example types of buses described in reference to the bus(es) 620 depicted in FIG. 6. Further, the I/O interface(s) 206 and the network interface(s) 208 may include any of the example types of I/O interfaces and network interfaces described in reference to I/O interface(s) 614 and network interface(s) 616, respectively, depicted in FIG. 6. Moreover, the radio(s) 210 and the antenna(s) 226 may include any of the example types of radios and antennas described in reference to the radio(s) 640 and the antenna(s) 658 depicted in FIG. 6.

The storage media 216 may include removable storage and/or non-removable storage including, but not limited to, the RFID tag 108, a machine-readable optical label affixed to the container 200, a 3-dimensional machine-readable pattern formed on a surface of the container 200, volatile memory (memory that maintains its state when supplied with power) such as random access memory (RAM), non-volatile memory (memory that maintains its state even when not supplied with power) such as read-only memory (ROM), flash memory, ferroelectric RAM (FRAM), and so forth. The storage media 216 may include any of the example types of memory described in reference to the memory 612 depicted in FIG. 6. In those example embodiments in which the storage media 216 includes only the RFID tag 108 or a machine-readable label or pattern, other example components (e.g., hardware components, program modules, etc.) depicted in FIG. 2 may be absent from the container 200.

In certain example embodiments, the storage media 216 may store computer-executable code, instructions, or the like that may be executable by a microcontroller 202 to cause the microcontroller 202 to perform or initiate various operations. More specifically, the storage media 216 may store one or more theft/tamper detection modules 218, one or more authentication modules 220, a container private key 222, a device public key 224, and so forth. The device public key 224 may be the public key 114 described earlier in this disclosure.

The theft/tamper detection module(s) 218 may include computer-executable code, instructions, or the like that may be executed by a microcontroller 202 to cause the microcontroller 202 to evaluate sensor data captured by the sensor(s) 204 against one or more threshold values to determine whether the sensor data is indicative of potential theft or tampering of the container 200. The sensor(s) 204 may include any suitable type of sensing device such as, for example, inertial sensors, force sensors, thermal sensors, and so forth. Example types of inertial sensors may include accelerometers (e.g., MEMS-based accelerometers), gyroscopes, and so forth.

For example, a microcontroller 202 may evaluate data received from a force sensor 204 to determine whether a force in excess a threshold permitted force is being applied to the container 200. As another example, the microcontroller 202 may evaluate data received from a thermal sensor 204 to determine whether the container 200 is being subjected to a temperature that falls outside of acceptable temperature limits. As yet another example, the microcontroller 202 may evaluate data received from an accelerometer 204 and/or a gyroscope 204 to determine whether the container 200 is being subjected to acceleration or vibration in excess of a threshold level of acceleration or vibration.

If, as a result of execution of the theft/tamper detection module(s) 218, the microcontroller 202 determines that the sensor data is outside of acceptable limits, computer-executable instructions of the theft/tamper detection module(s) 218 may be executed to generate an alert message. The alert message may be sent using a network interface 208 to a designated recipient via, for example, a cellular network, a WiFi network, or the like. The recipient may be, for example, a network address of a service provider with whom a product order corresponding to a product housed in the container 200 was placed. The service provider may then provide an indication of the alert message to a user profile with which the product order is associated. In addition, in certain example embodiments, upon detection of potential theft or tampering, computer-executable instructions of the theft/tamper detection module(s) 218 may be executed to cause a visual and/or audible alarm to be outputted via an I/O interface 206 of the container 200, to initiate a process for destroying or rendering inactive the product housed in the container 200, to permanently disable the capability to deactivate a locking mechanism of the container 200, or the like.

In certain example embodiments, the container 200 may include a GPS or other satellite-based navigation receiver. Satellite signals may be received and processed by the GPS receiver to determine a location of the container 200. If the location of the container 200 is determined to be more than a threshold distance from a delivery address associated with the product order, computer-executable instructions of the theft/tamper detection module(s) 218 may be executed to generate an alert message. Alternatively, the location of the container 200 determined by the GPS receiver may be provided to a remote server configured to determine whether the container location is within a threshold distance of the delivery address or to determine, based on third-party data, whether the container 200 is located in a geographic region associated with a high likelihood of criminal activity, prescription drug abuse, or the like. If the remote server determines that the container location is not within the threshold distance or within an unsafe geographic region, it may send an instruction to the container 200 to output an alarm, destroy or render inactive the product housed in the container, permanently disable the capability to unlock the locking mechanism of the container, or the like.

The authentication module(s) 220 may include computer-executable instructions, code, or the like that may be executed by a microcontroller 202 to cause the microcontroller 202 to authenticate a user device (e.g., the user device 102). For example, the authentication module(s) may receive the container public key 124 and determine whether the public key 124 corresponds to the private key 222 stored in the storage media 216 of the container 200.

Illustrative Processes

Figure 3:
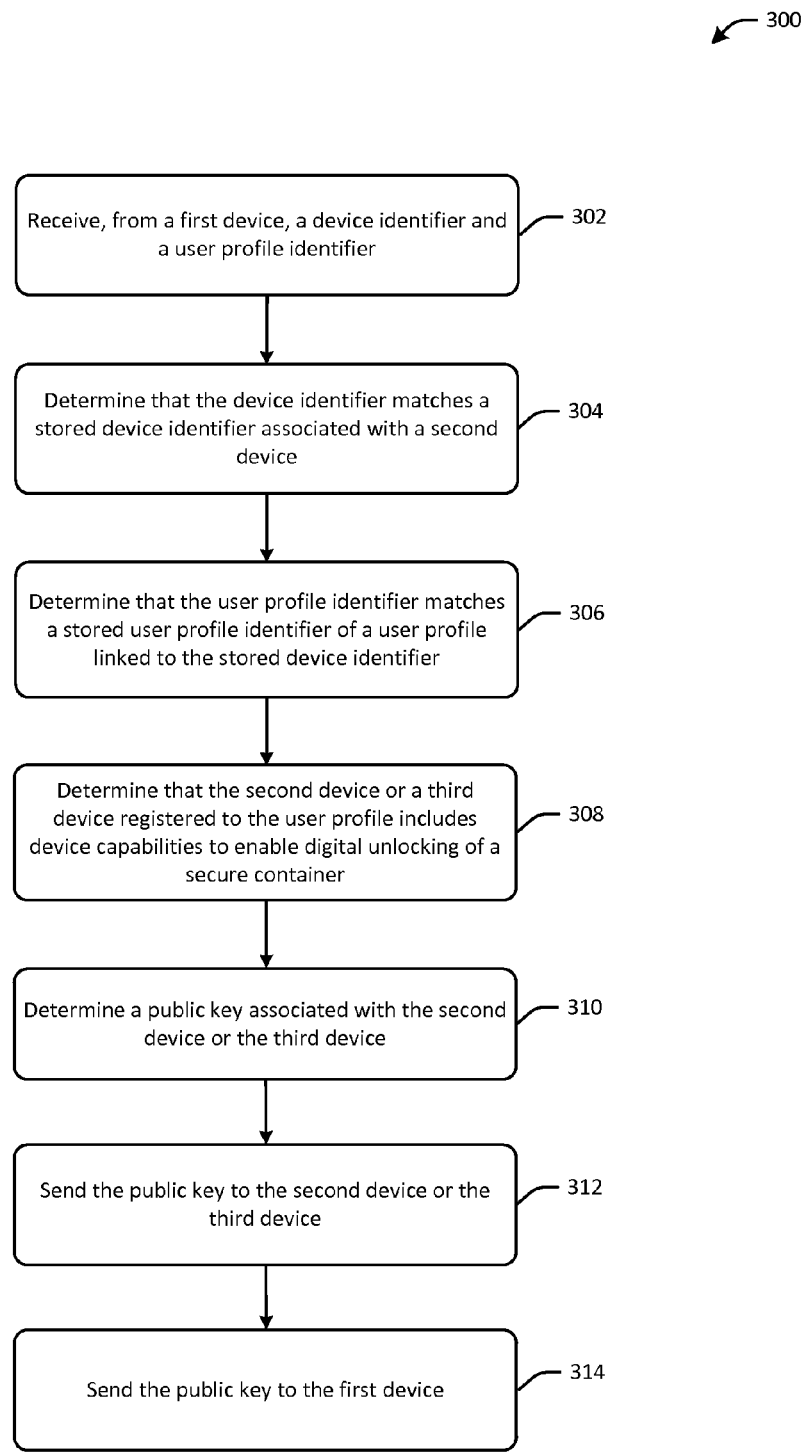
FIG. 3 is a process flow diagram of an illustrative method for generating a public key that pairs with a private key associated with a particular user device in accordance with one or more example embodiments of the disclosure.

FIG. 3 is a process flow diagram of an illustrative method 300 for generating a public key that pairs with a private key associated with a particular user device in accordance with one or more example embodiments of the disclosure. One or more operations of method 300 may be performed by a server that is located remotely from the first device and the second device (e.g., the back-end server 602 having the illustrative configuration depicted in FIG. 6), or more specifically, by one or more program modules executing on the server 602.

At block 302, a remote server may receive, from a first device, a device identifier and a user profile identifier. The device identifier may correspond to a second device and may have been captured by the first device during a communication session between the first device and the second device. For example, the first device may be the pharmacist's device and the second device may be the patient's device in the example use case described earlier in this disclosure. The user profile identifier may be an obfuscated customer ID associated with a user profile to which a product order has been linked.

At block 304, computer-executable instructions of one or more user authentication modules of the remote server may be executed to determine that the received device identifier matches a stored device identifier associated with a second device. Further, at block 306, computer-executable instructions of the user authentication module(s) of the remote server may be executed to determine that the received user profile identifier matches a stored user profile identifier of a user profile linked to the stored device identifier. Based on the operations at blocks 304 and 306, the remote server may determine that the device used to authorize the product order is a registered device associated with the user profile to which the product order has been linked. In this manner, the second device and a user of the second device may be authenticated.

At block 308, the remote server may determine that the second device or a third device registered to the user profile includes device capabilities (e.g., hardware, firmware, and/ or software) required to enable digital unlocking of a secure container. For example, in certain example embodiments, the second device may not possess such capabilities. However, a secure container may nonetheless be used to deliver an order product if the remote server determines that a third device that is registered in connection with the user profile possesses such capabilities.

At block 310, computer-executable instructions of one or more key generation modules of the remote server may be executed to determine a public key associated with the second device or the third device registered to the user profile. For example, a public key that corresponds to a private key stored on the second device or the third device may be generated or a pre-existing public key may be retrieved. As previously noted, in certain example embodiments, the second device used to authorize a product order may not be configured to perform the authentication protocol described herein for authenticating a secured container and initiating an unlocking protocol. In such example embodiments, a third device that is so configured and that is registered to the same user profile as the second device may be identified and a public key associated with the third device may be determined.

At block 312, the remote server may send the public key to the second device or the third device as the case may be. In certain example embodiments, the remote server may also associate a TTL value with the public key that determines a time period during which the public key is valid for use in authenticating a secured container. Further, in certain example embodiments, the remote server may send or indicate a cryptographic hash function for the second (or third) device to use to validate a public-private key pair. Further, at block 314, the remote server may send the public key to the first device so that a vendor associated with the first device may encode the public key on a storage medium of a secure container if the vendor is the entity shipping the ordered product to the user.

Figure 4:
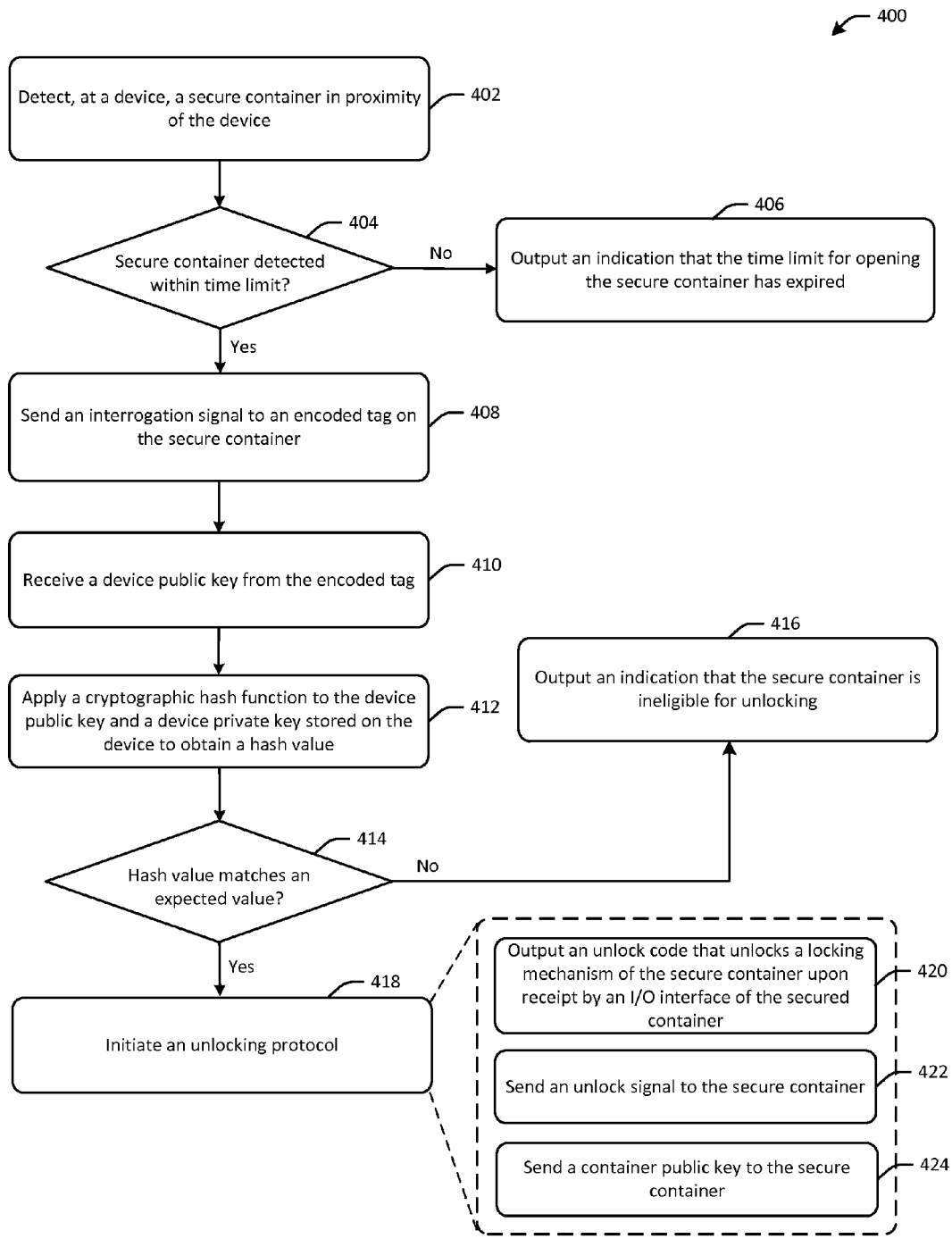
FIG. 4 is a process flow diagram of an illustrative method for authenticating a secure container with respect to a user device and outputting data to cause or otherwise enable deactivation of a locking mechanism of the secure container in accordance with one or more example embodiments of the disclosure.

FIG. 4 is a process flow diagram of an illustrative method 400 for authenticating a secure container with respect to a user device and outputting data to cause or otherwise enable deactivation of a locking mechanism of the secure container in accordance with one or more example embodiments of the disclosure. One or more operations of the method 400 may be performed by a user device (e.g., the user device 604, the user device 102), or more specifically, by one or more applications, program modules, etc. executing on the user device, potentially in a distributed fashion with a server application or service (e.g., a virtual assistant) associated with a remote server (e.g., back-end server 602). While method 400 illustrates authentication of a secure container by a user device, it should be appreciated that one or more corresponding operations may be performed on a secure container to authenticate a user device.

At block 402, computer-executable instructions of one or more secure container detection modules of a user device may be executed to detect a secure container in proximity of the device. In certain example embodiments, the user device may detect the secure container based on a wireless signal (e.g., a Bluetooth signal, a WiFi signal, etc.) received from the container. In other example embodiments, the user device may detect the container after the container is placed in the field-of-view of a camera associated with the user device. In still other example embodiments, a virtual assistant may be accessed via the user device by, for example, a user uttering a wake word in proximity of the user device, and the virtual assistant may instruct the user to place the container within proximity of the user device and notify the virtual assistant when this action is completed. The user may notify the virtual assistant that the container has been placed within proximity of the user device via an audible input to the user device or a touch-based interaction with the user device.

At block 404, computer-executable instructions of one or more authentication modules of the user device may be executed to determine whether the secure container has been detected within a predetermined time limit from when a public key encoded in a storage medium of the container was generated and/or from when an order for a product housed in the container was placed. In response to a negative determination at block 404, the user device may output an indication that the time limit for opening the secure container has expired, in which case, a user may be required to contact a customer service representative and provide additional user identifying information to authenticate him/herself in order to receive an unlock code or have an unlock signal sent to the container to deactivate a locking mechanism of the container.

On the other hand, in response to a positive determination at block 404, computer-executable instructions of the authentication module(s) of the user device may be executed to obtain a public key encoded in a storage medium of the container via a challenge/response mechanism. More specifically, the user device may issue a challenge to the container and may receive the public key in response to the challenge. For example, in those example embodiments in which the public key is encoded on an RFID tag affixed to, embedded in, or otherwise associated with the container, an RFID reader of the user device may broadcast an interrogation signal. Upon detection of the interrogation signal, the RFID tag may respond with the public key encoded on the tag, which may be received by the user device at block 410.

Upon receipt of the public key, computer-executable instructions of the authentication module(s) of the user device may be executed to provide the public key and a private key stored on the device as inputs to a cryptographic hash function to obtain a hash value at block 412. At block 414, computer-executable instructions of the authentication module(s) of the user device may be executed to determine whether the hash value obtained at block 412 matches an expected value. In response to a negative determination at block 416, the user device may output an indication that the secure container is ineligible for unlocking. On the other hand, in response to a positive determination at block 418, computer-executable instructions of one or more unlocking modules of the user device may be executed to initiate an unlocking protocol to deactivate (e.g., unlock) a locking mechanism of the secure container.

In certain example embodiments, the unlocking protocol may include transmitting a container public key to the container. Upon receipt of this container public key, the container may determine whether the public key corresponds to a private key stored on a storage medium of the container. If the container (or more specifically, a microcontroller of the container) determines that the public key received from the user device corresponds to its stored private key, the locking mechanism may be deactivated and the container may transition to an unlocked state in which the container can be opened and the product housed therein retrieved.

In other example embodiments, the unlocking protocol may include outputting an unlock code that a user may provide to an input interface of the secure container to cause the locking mechanism of the container to deactivate. The unlock code may be displayed as part of a user interface rendered on a display of the user device, provided as part of audio data outputted from a speaker of the user device, or the like.

In still other example embodiments, the user device may send a wireless unlock signal to a reception component of the secure container. For example, the user device may emit a WiFi or Bluetooth signal that is received by an antenna of the secure container, converted to an electrical signal by a corresponding radio of the container, and processed by a microcontroller of the container to cause the locking mechanism of the container to deactivate. Alternatively, the user device may emit an inaudible audio signal (e.g., a sequence of inaudible tones) that is received by the reception component of the container and that causes the locking mechanism to automatically deactivate.

It should be appreciated that an RFID interrogation signal and encoding of the public key on an RFID tag is merely an example challenge/response mechanism that may be used to authenticate the container with respect to the user device. In another example embodiment, the public key may be encoded in a machine-readable optical label affixed to the container or encoded in a physical pattern (e.g., a 3-dimensional QR code) embossed on a surface of the container. The machine-readable label or pattern may be positioned in a field-of-view of a camera or other imaging device integrated with the user device or communicatively coupled thereto. The camera or other imaging device may scan (e.g., generate an image of) the label or pattern and process the scanned image to determine the public key. In still other example embodiments, the user device may establish a wireless communication link with the container (e.g., a Bluetooth pairing), and the container may transmit the public key to the user device over the wireless link.

Figure 5:
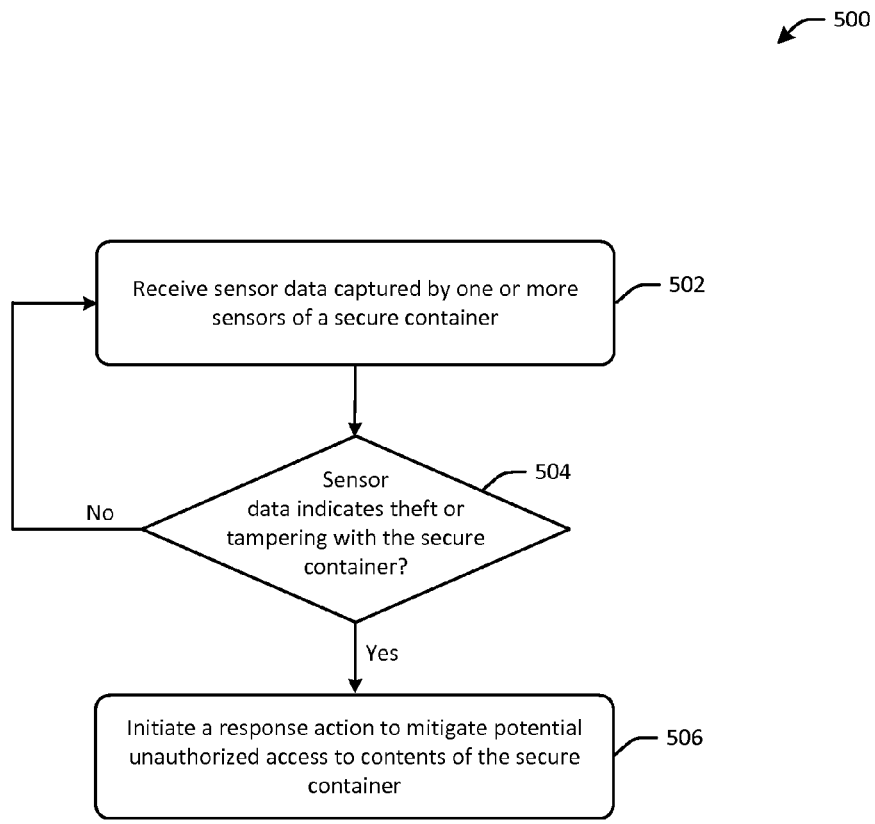
FIG. 5 is a process flow diagram of an illustrative method for utilizing sensor data captured by one or more sensors of a secure container to determine that potential theft or tampering of the container has occurred and performing a response action in accordance with one or more example embodiments of the disclosure.

FIG. 5 is a process flow diagram of an illustrative method 500 for utilizing sensor data captured by one or more sensors of a secure container to determine that potential theft or tampering of the container has occurred and generating an alert message indicative thereof in accordance with one or more example embodiments of the disclosure. One or more operations of the method 500 may be performed by a secure container (e.g., the container 200), or more specifically, by one or more program modules executing on such a container.

At block 502, computer-executable instructions of the theft/tamper detection module(s) 218 may be executed to determine sensor data captured by one or more sensors of a secure container. At block 504, computer-executable instructions of the theft/tamper detection module(s) 218 may be executed to determine whether the sensor data indicates theft of the container of tampering with the container. More specifically, at block 504, a microcontroller of the container may evaluate the sensor data against one or more threshold values to determine whether the sensor data is indicative of potential theft or tampering of the container.

In response to a negative determination at block 504, the method 500 may iteratively return to block 502 where additional sensor data captured by sensor(s) of the container may be determined. On the other hand, in response to a positive determination at block 504, computer-executable instructions of the theft/tamper detection module(s) 218 may be executed at block 506 to perform a response action to mitigate potential unauthorized access to contents of the secure container. In certain example embodiments, computer-executable instructions of the theft/tamper detection module(s) 218 may be executed to send an alert message using a network interface of the container to a designated recipient via, for example, a cellular network, a WiFi network, or the like. The recipient may be, for example, a network address of a service provider with whom a product order corresponding to a product housed in the container was placed. The service provider may then provide an indication of the alert message to a user profile with which the product order is associated. In addition, in certain example embodiments, in response to a positive determination at block 504, computer-executable instructions of the theft/tamper detection module(s) 218 may be executed to cause a visual and/or audible alarm to be outputted via an I/O interface of the container, to initiate a process for destroying or rendering inactive the product housed in the container, to permanently disable the capability to deactivate a locking mechanism of the container, or the like.

Illustrative Networked Architecture

FIG. 6 is a schematic diagram of an illustrative networked architecture 600 in accordance with one or more example embodiments of the disclosure. The networked architecture 600 may include one or more back-end servers 602 and one or more user devices 604. One or more users 606 may interact with the user device(s) 604. For example, a user 606 may utilize a user device 604 to access one or more applications executing on the user device 604 and view or otherwise interact with content displayed on a display of the user device 604. The user device(s) 604 may, in various example embodiments, include the display device 102 depicted in earlier figures. Further, the back-end server(s) 602 may include any of the remote server(s) referenced earlier in this disclosure. While the back-end server(s) 602 and/or the user device(s) 604 may be referred to herein in the singular, it should be appreciated that multiple ones of any of the illustrative components of the networked architecture 600 may be provided, and any processing described as being performed by a particular component of the architecture 600 may be performed in a distributed manner by multiple such components.

The back-end server 602 and the user device 604 may be configured to communicate via one or more networks 608. In addition, a first user device 604 may be configured to communicate with a second user device 604 via the network(s) 608 (and potentially via the back-end server 602). The network(s) 608 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 608 may have any suitable communication range associated therewith and may include, for example, global networks (e.g., the Internet), metropolitan area networks (MANs), wide area networks (WANs), local area networks (LANs), or personal area networks (PANs). In addition, the network(s) 608 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the back-end server 602 may include one or more processors (processor(s)) 610, one or more memory devices 612 (generically referred to herein as memory 612), one or more input/output ("I/O") interface(s) 614, one or more network interfaces 616, and data storage 618. The back-end server 602 may further include one or more buses 620 that functionally couple various components of the server 602. These various components of the server 602 will be described in more detail hereinafter.

The bus(es) 620 may include at least one of a system bus, a memory bus, an address bus, or a message bus, and may permit exchange of information (e.g., data (including computer-executable code), signaling, etc.) between various components of the server 602. The bus(es) 620 may include, without limitation, a memory bus or a memory controller, a peripheral bus, an accelerated graphics port, and so forth. The bus(es) 620 may be associated with any suitable bus architecture including, without limitation, an Industry Standard Architecture (ISA), a Micro Type Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 612 of the server 602 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 612 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 612 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 618 may include removable storage and/or non-removable storage including, but not limited to, magnetic storage, optical disk storage, and/or tape storage. The data storage 618 may provide non-volatile storage of computer-executable instructions and other data. The memory 612 and the data storage 618, removable and/or non-removable, are examples of computer-readable storage media (CRSM) as that term is used herein.

The data storage 618 may store computer-executable code, instructions, or the like that may be loadable into the memory 612 and executable by the processor(s) 610 to cause the processor(s) 610 to perform or initiate various operations. The data storage 618 may additionally store data that may be copied to memory 612 for use by the processor(s) 610 during the execution of the computer-executable instructions. Moreover, output data generated as a result of execution of the computer-executable instructions by the processor(s) 610 may be stored initially in memory 612, and may ultimately be copied to data storage 618 for non-volatile storage.

More specifically, the data storage 618 may store one or more operating systems (O/S) 622; one or more database management systems (DBMS) 624; and one or more program modules, applications, or the like such as, for example, one or more key generation modules 626 and one or more user authentication modules 628. Any of the program modules may include one or more sub-modules. Any of the modules depicted in FIG. 6 may include computer-executable code, instructions, or the like that may be loaded into the memory 612 for execution by one or more of the processor(s) 610. In particular, the program modules depicted as part of the back-end server 602 may enable any of the functionality described earlier in connection with similar named modules. The back-end server 602 may further include any number of additional program modules to enable any of the functionality described earlier in connection with a remote server, a back-end server, or the like. In addition, any data stored in one or more datastores 660 may be accessed via the DBMS 624, stored in the data storage 618, and loaded in the memory 612 for use by the processor(s) 610 in executing computer-executable code of any of the program modules.

The datastore(s) 660 may include, without limitation, databases (e.g., relational, object-oriented, etc.), file systems, flat files, distributed datastores in which data is stored on more than one node of a computer network, peer-to-peer network datastores, or the like. The datastore(s) 660 may store various types of data such as, for example, customer data 662, device data 664, secure container data 666, and third-party data 668. The customer data 662 may include user profile information (e.g., customer IDs and/or an obfuscated customer IDs of various user profiles, product order information associated with the user profiles, secure container identifiers associated with product orders, etc.). The device data 664 may include information associated with devices that are registered to a user profile such as, for example, MAC addresses, DSNs, IP addresses, private keys, etc. The secure container data 666 may include unique identifiers associated with secure containers, public keys encoded on storage media of secure containers, etc. The third-party data 668 may include, for example, criminal activity data associated with one or more geographic regions. Any data stored in the datastore(s) 660 may be generated by the back-end server 602 and/or the user device 604. Further, any data stored in the datastore(s) 660 may be generated by one component of the networked architecture 600, stored in the datastore(s) 660, and retrieved from the datastore(s) 660 by another component of the networked architecture 600.

The processor(s) 610 may be configured to access the memory 612 and execute computer-executable instructions loaded therein. For example, the processor(s) 610 may be configured to execute computer-executable instructions of the various program modules of the server 602 to cause or facilitate various operations to be performed in accordance with one or more embodiments of the disclosure. The processor(s) 610 may include any suitable processing unit capable of accepting data as input, processing the input data in accordance with stored computer-executable instructions, and generating output data. The processor(s) 610 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 610 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 610 may be capable of supporting any of a variety of instruction sets.

Referring now to other illustrative components depicted as being stored in the data storage 618, the O/S 622 may be loaded from the data storage 618 into the memory 612 and may provide an interface between other application software executing on the server 602 and hardware resources of the server 602. More specifically, the O/S 622 may include a set of computer-executable instructions for managing hardware resources of the server 602 and for providing common services to other application programs (e.g., managing memory allocation among various application programs). The O/S 622 may include any operating system now known or which may be developed in the future including, but not limited to, any server operating system, any mainframe operating system, or any other proprietary or non-proprietary operating system.

The DBMS 624 may be loaded into the memory 612 and may support functionality for accessing, retrieving, storing, and/or manipulating data stored in the memory 612 and/or data stored in the data storage 618. The DBMS 624 may use any of a variety of database models (e.g., relational model, object model, etc.) and may support any of a variety of query languages. The DBMS 624 may access data represented in one or more data schemas and stored in any suitable data repository.

Referring now to other illustrative components of the server 602, one or more input/output (I/O) interfaces 614 may be provided that may facilitate the receipt of input information by the server 602 from one or more I/O devices as well as the output of information from the server 602 to the one or more I/O devices. The I/O devices may include, for example, one or more user interface devices that facilitate interaction between a user and the server 602 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The server 602 may further include one or more network interfaces 616 via which the server 602 may communicate with any of a variety of other systems, platforms, networks, devices, and so forth. Such communication may occur via any of one or more of the network(s) 608.

The user device(s) 604 may include a display, a touch sensor, one or more processors, one or more memories, persistent data storage, input/output interface(s), network interface(s), and so forth. In certain example embodiments, a user device 604 may be configured for stationary use within a particular environment.

In an illustrative configuration, the user device 604 may include one or more processors (processor(s)) 630, one or more memory devices 632 (generically referred to herein as memory 632), one or more input/output ("I/O") interface(s) 634, one or more sensors or sensor interfaces 636, one or more network interfaces 638, one or more radios 640, one or more antennas 658, and data storage 642. The user device 604 may further include one or more buses 644 that functionally couple various components of the user device 604. The data storage 642 may store one or more operating systems (O/S) 646; one or more database management systems (DBMS) 648; and one or more program modules, applications, or the like such as, for example, one or more secure container detection modules 652, one or more authentication modules 654, and one or more unlocking modules 656. These program modules may form part of a secure container unlocking application 650. The program modules depicted in FIG. 6 as being stored in the data storage 642 of the user device 604 may enable functionality similar to that previously described in connection with similarly named modules. The user device 604 may further include any number of additional program modules to enable any of the functionality described earlier in connection with a user device (e.g., the user device 102).

The antenna(s) 658 may include a cellular antenna for transmitting or receiving signals to/from a cellular network infrastructure, an antenna for transmitting or receiving Wi-Fi signals to/from a wireless access point or another Wi-Fi enabled device, an antenna for receiving GNSS signals from a GNSS satellite, an antenna for transmitting or receiving Bluetooth signals, and/or one or more other antennas such as, for example, a Near Field Communication (NFC) antenna for transmitting or receiving NFC signals. In certain example embodiments, the antenna(s) 658 may include a shared antenna capable of transmitting and receiving data using multiple different wireless communication standards.

The antenna(s) 658 may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) 658 may be communicatively coupled to one or more radios 640 to which or from which signals may be transmitted or received.

As previously noted, the antenna(s) 658 may include a Wi-Fi antenna. The WiFi antenna may be configured to transmit or receive signals in accordance with established standards and protocols, such as the IEEE 802.11 family of standards, including via 2.4 GHz channels (e.g. 802.11a, 802.11b, 802.11g, 802.11n, etc.), 5 GHz channels (e.g. 802.11n, 802.11ac, etc.), or 60 GHZ channels (e.g. 802.11ad).

If included among the antenna(s) 658, a cellular antenna may be configured to transmit or receive signals in accordance with established standards and protocols, such as GSM, 3G standards (e.g., Universal Mobile Telecommunications System (UMTS), Wideband Code Division Multiple Access (W-CDMA), CDMA2000, etc.), 4G standards (e.g., LTE, WiMax, etc.), direct satellite communications, or the like.

If included among the antenna(s) 658, a GNSS antenna may be configured to receive GNSS signals from three or more GNSS satellites carrying time-position information to triangulate a position therefrom. The GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The radio(s) 640 may include any suitable component(s) for, in cooperation with the antenna(s) 658, transmitting or receiving RF signals in the bandwidth and/or channels corresponding to the communications protocols utilized by the user device 604 to communicate with other devices. The radio(s) 640 may include hardware, software, and/or firmware for modulating, transmitting, or receiving—potentially in cooperation with any of antenna(s) 658—communications signals according to any of the communications protocols discussed above including, but not limited to, one or more Wi-Fi and/or Wi-Fi direct protocols, as standardized by the IEEE 802.11 standards, one or more Bluetooth protocols, or one or more cellular communications protocols or standards. The radio(s) 640 may further include hardware, firmware, or software for receiving GNSS signals from a corresponding antenna of the antenna(s) 658. The radio(s) 640 may include any known receiver and baseband suitable for communicating via the communications protocols utilized by the user device 604. The radio(s) 640 may further include a low noise amplifier (LNA), additional signal amplifiers, an analog-to-digital (A/D) converter, one or more buffers, digital baseband, or the like.

The sensor(s) 636 may include any suitable type of sensing device such as, for example, inertial sensors, force sensors, thermal sensors, and so forth. Example types of inertial sensors may include accelerometers (e.g., MEMS-based accelerometers), gyroscopes, and so forth.

Any of the modules depicted as part of the user device 604 in FIG. 6 may include computer-executable code, instructions, or the like that may be loaded into the memory 632 for execution by one or more of the processor(s) 630. Each module depicted as part of the user device 604 may enable similar functionality as described earlier in connection with similarly named modules. Further, any of the functionality associated with any of the program modules depicted as part of the user device 604 and/or any functionality associated with any program modules depicted as part of the server 602 may be distributed, at least partially, between the server 602 and the user device 604. Further, any of the illustrative components of the user device 604 may correspond in type and/or function to correspondingly named components of the server 602.

It should be appreciated that the program modules, applications, computer-executable instructions, code, or the like depicted in FIG. 6 as being stored in the data storage 618 and the data storage 642 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 602, locally on the user device 604, and/or hosted on other computing device(s) accessible via one or more of the network(s) 608, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

It should further be appreciated that any of the components of the networked architecture 600 may include alternate and/or additional hardware, software, or firmware components beyond those described or depicted without departing from the scope of the disclosure. More particularly, it should be appreciated that software, firmware, or hardware components depicted as forming part of the server 602 and/or the user device 604 are merely illustrative and that some components may not be present or additional components may be provided in various embodiments. While various illustrative program modules have been depicted and described as software modules stored in data storage 618 or the data storage 642, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a tile of the described functionality and/or additional functionality. Moreover, while certain modules may be depicted and described as sub-modules of another module, in certain embodiments, such modules may be provided as independent modules or as sub-modules of other modules.

One or more operations of the methods 300-500 described above may be performed by one or more program modules, applications, or the like executing on the server 602 or by one or more program modules, applications, or the like executing on one or more user devices 604. It should further be appreciated that any of the operations of the methods 300-500 may be performed, at least in part, in a distributed manner by one or more servers 602 and one or more user devices 604, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods 300-500 may be performed in the context of the illustrative configuration of the server 602 and/or the illustrative configuration of the user device 604 depicted in FIG. 6, it should be appreciated that such operations may be implemented in connection with numerous other device configurations.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a tile of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may,"

unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
sending, by a user device, a private key stored on the user device to a back-end server;
receiving, by the user device from the back-end server, a first public key, wherein the first public key is based at least in part on the private key;
determining an expected value using the private key and the first public key;
detecting, at the user device, data indicating that a container is within proximity of the user device, wherein the container includes a mechanical lock;
sending, by the user device, a radio frequency identification (RFID) signal using an RFID reader of the user device;
receiving, at the user device, an RFID response signal from an RFID circuit affixed to the container, the RFID response signal containing encrypted data that includes data that is based at least in part on an indication of the user device having been detected;
decrypting, at the user device, the encrypted data to obtain a second public key;
generating a hash value by executing a cryptographic hash function on at least the private key and the second public key;
determining the second public key is paired with the private key based at least in part on the hash value matching the expected value;
sending, based at least in part on the determining the second public key is paired with the private key, an unlock signal to the container to cause the mechanical lock to be deactivated; and
receiving, at the user device, an unlock verification signal indicating that the mechanical lock has been deactivated.

2. The method of claim 1, further comprising establishing, by the user device, a WiFi Direct connection with the container using WiFi authentication credentials stored on the RFID circuit.

3. The method of claim 1, further comprising:
sending, by the user device, a notification to the back-end server indicating that the mechanical lock was deactivated; and
receiving, at the user device, an email indicating that the container has been unlocked.

4. The method of claim 1, further comprising:
determining a first timestamp associated with receipt of data indicating that the container is in proximity of the user device;
determining that the first timestamp is within a predetermined period of time of a second timestamp associated with an order for a product that is in the container; and
determining that the container is eligible to be unlocked.

5. A method, comprising:
determining, at a user device, that a container is within proximity of the user device;
determining, based at least in part on information received at the user device, that the container includes a mechanical locking mechanism that has been activated;
sending a signal to the container;
receiving a response from the container, wherein the response comprises a public key and an indication of the user device having been detected;
determining a private key stored on the user device;
generating a hash value by executing a cryptographic hash function on at least the private key and the public key;
determining the hash value matches an expected value, wherein the expected value is based at least in part on a second public key received from a source different than the container;
determining that the public key is paired with the private key based at least in part on the hash value matching the expected value;
outputting, based at least in part on the determining that the public key is paired with the private key, first data configured to deactivate the mechanical locking mechanism; and
receiving, at the user device, second data indicating that the mechanical locking mechanism has been deactivated.

6. The method of claim 5, wherein outputting data configured to deactivate the mechanical locking mechanism comprises at least one of:
displaying an unlock code on a display of the user device; or
outputting audio data indicative of the unlock code, wherein the unlock code is configured to cause the mechanical locking mechanism to deactivate.

7. The method of claim 5, further comprising sending an indication that the mechanical locking mechanism has been deactivated.

8. The method of claim 5, wherein the first data includes inaudible audio data.

9. The method of claim 5, further comprising:
determining a first timestamp associated with receipt of user input indicating that the container has been placed in proximity of the user device;
determining that the first timestamp is within a predetermined period of time of a second timestamp associated with an order for a product that is in the container; and
determining that the container is eligible to be unlocked.

10. The method of claim 5, wherein receiving the response from the container comprises:
receiving, at the user device, a signal, the signal containing encrypted data; and
decrypting, at the user device, the encrypted data to obtain the public key.

11. The method of claim 10, wherein decrypting the encrypted data further comprises decrypting the encrypted data to obtain an identifier, the method further comprising determining that the identifier matches a device identifier associated with the user device.

12. The method of claim 5, further comprising determining the public key based at least in part on a machine-readable optical label of the container.

13. The method of claim 5, further comprising:
receiving data indicative of an identity of a user of the user device;
determining a user profile associated with the data indicative of the identity of the user; and
determining that the public key is associated with the user profile.

14. The method of claim 5, wherein receiving the second public key includes receiving the second public key from a server.

15. A securable container, comprising:
   a mechanical locking mechanism;
   a storage medium storing a private key;
   at least one memory storing computer-executable instructions; and
   at least one processor operatively coupled to the at least one memory, wherein the at least one processor is configured to execute the computer-executable instructions to:
   receive, based on the container being within a proximity of a user device, a signal from the user device that includes a public key;
   execute a cryptographic hash function on the public key and the private key to obtain a hash value;
   determine that the public key is paired with the private key based on the hash value matching an expected value;
   generate, based at least in part on the determination that the public key is paired with the private key, first data;
   deactivate the mechanical locking mechanism using the first data; and
   send an indication to the user device that the mechanical locking mechanism has been deactivated.

16. The securable container of claim 15, wherein the at least one processor is further configured to execute the computer-executable instructions to:
   send an indication to a server that the mechanical locking mechanism has been deactivated.

17. The securable container of claim 15, further comprising an RFID triggered circuit comprising the storage medium.

18. The securable container of claim 15, further comprising:
   at least one sensor;
   wherein the least one processor is further configured to execute the computer-executable instructions to:
   determine sensor data captured at the at least one sensor;
   determine that the sensor data exceeds a threshold value;
   generate an alert message indicating potential tampering of the container; and
   send the alert message.

19. The securable container of claim 18, wherein the at least one sensor comprises at least one of an accelerometer or a force sensor.

20. The securable container of claim 15, further comprising a Global Positioning System (GPS) receiver and an antenna, wherein the at least one processor is further configured to execute the computer-executable instructions to:
   determine a location of the container using position data received by the GPS receiver via the antenna;
   determine that the location is a threshold distance from a registered location associated with a user profile or that the location is within a particular geographic region;
   generate an alert message indicating potential theft of the container; and
   send the alert message.

\* \* \* \* \*